United States Patent [19]

Yoshida et al.

[11] Patent Number: 4,913,532
[45] Date of Patent: Apr. 3, 1990

[54] LIQUID CRYSTAL COMPOSITION AND LIQUID CRYSTAL DISPLAY DEVICE USING THE SAME

[75] Inventors: Tetsushi Yoshida; Ken Kozima, both of Tokyo, Japan

[73] Assignee: Casio Computer Co., Ltd., Tokyo, Japan

[21] Appl. No.: 259,045

[22] Filed: Oct. 17, 1988

[30] Foreign Application Priority Data

Oct. 19, 1987 [JP] Japan .................. 62-263147

[51] Int. Cl.⁴ .................. C09K 19/34; G02F 1/13
[52] U.S. Cl. .................. 350/350 R; 252/299.01; 252/299.5; 252/299.61
[58] Field of Search .................. 252/299.01, 299.61, 252/299.5; 350/350 R

[56] References Cited

U.S. PATENT DOCUMENTS

| | | | |
|---|---|---|---|
| 4,510,069 | 4/1985 | Eidensehine et al. | 252/299.63 |
| 4,643,841 | 2/1987 | Ishii et al. | 252/299.61 |
| 4,670,182 | 6/1987 | Fujita et al. | 252/299.61 |
| 4,713,197 | 12/1987 | Eidenschink et al. | 252/299.61 |
| 4,722,804 | 2/1988 | Ishii et al. | 252/299.61 |
| 4,737,311 | 4/1988 | Scheuble et al. | 252/299.61 |
| 4,737,312 | 4/1988 | Matsumoto et al. | 252/299.61 |
| 4,752,414 | 6/1988 | Eidenschink et al. | 252/299.61 |
| 4,776,973 | 10/1988 | Bofinger et al. | 252/299.61 |
| 4,788,000 | 11/1989 | Ishii et al. | 252/299.61 |
| 4,789,508 | 12/1988 | Vinet et al. | 252/299.63 |
| 4,799,774 | 1/1989 | Baur et al. | 252/299.01 |
| 4,812,258 | 3/1989 | Frause et al. | 252/299.61 |
| 4,815,825 | 3/1989 | Nakagomi et al. | 252/299.63 |
| 4,818,428 | 4/1989 | Scheuble et al. | 252/299.61 |

FOREIGN PATENT DOCUMENTS

| | | | |
|---|---|---|---|
| 107759 | 5/1984 | European Pat. Off. | 252/299.63 |
| 151446 | 8/1985 | European Pat. Off. | 252/299.61 |
| 174541 | 3/1986 | European Pat. Off. | 252/299.01 |
| 3404117 | 8/1985 | Fed. Rep. of Germany | 252/299.61 |
| 61-44991 | 3/1986 | Japan | 252/299.61 |
| 61-62590 | 3/1986 | Japan | 252/299.61 |
| 61-176685 | 8/1986 | Japan | 252/299.61 |
| 62-220577 | 9/1987 | Japan | 252/299.61 |
| 63-92689 | 4/1988 | Japan | 252/299.61 |
| 104686 | 4/1989 | Japan | |
| 59-221377 | 12/1989 | Japan | 252/299.61 |
| 8605799 | 10/1986 | World Int. Prop. O. | 252/299.61 |
| WO87/05714 | 9/1987 | World Int. Prop. O. | |
| 8802130 | 3/1988 | World Int. Prop. O. | 252/299.01 |
| 8903867 | 5/1989 | World Int. Prop. O. | 252/299.01 |

*Primary Examiner*—Teddy S. Gron
*Attorney, Agent, or Firm*—Frishauf, Holtz, Goodman & Woodward

[57] ABSTRACT

A liquid crystal composition having a positive dielectric anisotropy contains 20 wt % to 70 wt % of a first liquid crystal material consisting of at least one liquid crystal compound represented by a formula

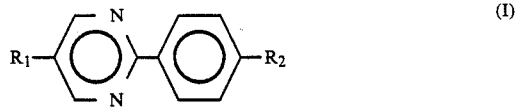

(I)

(wherein $R_1$ represents a linear alkyl group having 2 to 9 carbon atoms and $R_2$ represents a linear alkyl group or alkoxy group having 2 to 9 carbon atoms), and 30 wt % to 80 wt % of a third liquid crystal material consisting of at least one liquid crystal compound in which a value of a dielectric anisotropy $\Delta\epsilon$ is negative or substantially "0". The liquid crystal composition optionally contains 10 wt % or less of a second liquid crystal material consisting of at least one liquid crystal compound having a positive dielectric anisotopy $\Delta\epsilon$. A liquid crystal display device is arranged such that the liquid crystal composition is interposed between a pair of substrates on which electrodes are formed.

25 Claims, 3 Drawing Sheets

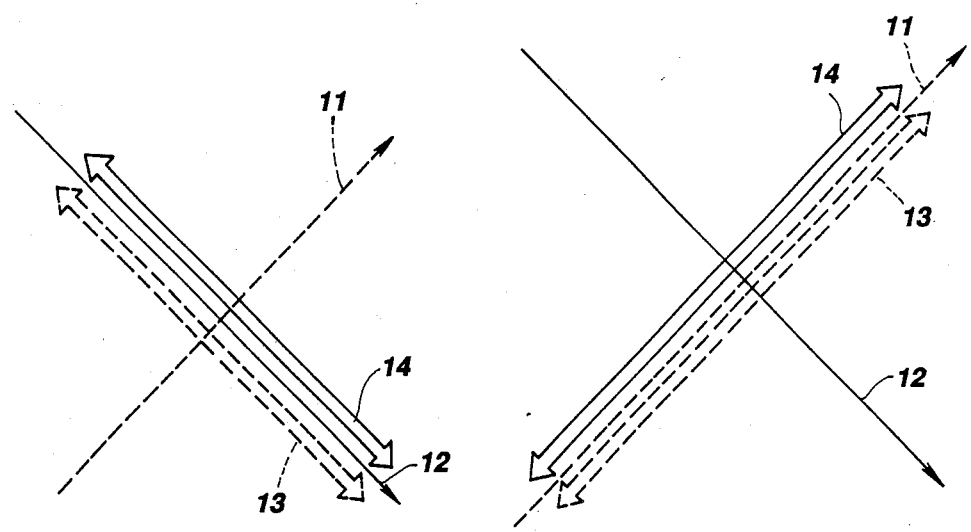
FIG. 4A  FIG. 4B
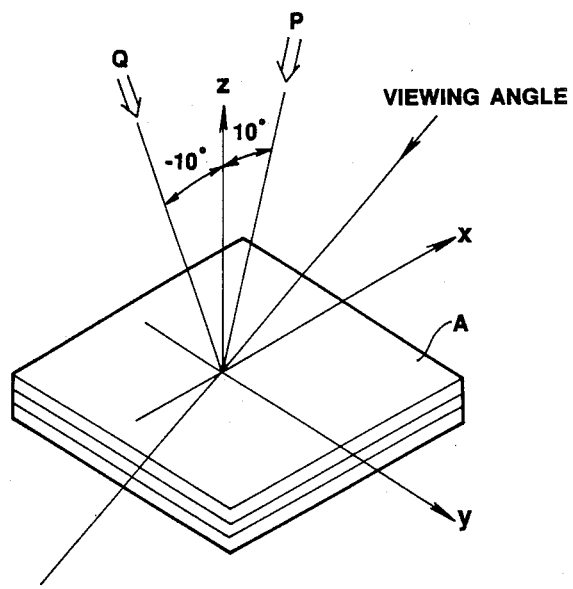
FIG. 5

LIQUID CRYSTAL COMPOSITION AND LIQUID CRYSTAL DISPLAY DEVICE USING THE SAME

BACKGROUND OF THE INVENTION

1. Field of the Invention

The present invention relates to a liquid crystal composition suitable for multiplex drive and a liquid crystal display device using the same.

2. Description of the Related Art

A liquid crystal display apparatus having a plurality of pixels arranged in a matrix manner is applied to a display unit of a computer terminal, an image display unit of a television receiver, and the like. Recently, a demand has arisen for a large size and high image quality of the image display unit. Therefore, an increase in number of pixels and an improvement in contrast are desired. A liquid crystal display apparatus applied to the image display unit has a simple matrix type twisted nematic liquid crystal display device (to be referred to as a matrix TN. LC. device) arranged such that a plurality of electrodes are aligned on inner surfaces of a pair of opposing substrates and opposing portions of the electrodes form a plurality of pixels aligned in a matrix manner. The matrix TN. LC. device is driven in a multiplexed manner.

In the matrix TN. LC. device, if the number of pixels is increased in order to improve the resolution and increase a display area, the number of scanning lines is naturally increased. Therefore, high multiplex drive must be performed. However, if a multiplexing degree is increased, a difference in effective voltages between an on electric field to be applied to a liquid crystal to turn on pixels and an off electric field to be applied to the liquid crystal to turn off the pixels is reduced. As a result, an operating margin of a drive voltage is reduced, the contrast is lowered, and a viewing angle characteristic is degraded.

The operating margin and the contrast of a liquid crystal display device depend on a voltage-luminance characteristic. That is, when a change in transmittivity with respect to a change in intensity of the electric field to be applied to the liquid crystals is steep, the operating margin can be increased, and the contrast can be increased. As shown in FIG. 1, the steepness of the voltage-luminance characteristic is represented by a ratio (to be referred to as $\gamma$ value hereinafter) between voltage $V_{50}$ at which the transmittivity is 50% and threshold voltage $V_C$. When the $\gamma$ value becomes closer to 1, the change in transmittivity becomes steeper. Therefore, the operating margin can be increased, and the contrast can be increased.

In addition, in the matrix TN. LC. device which is of high multiplex drive type, a multiplexing degree is increased, and one selection period is shortened. Therefore, the matrix TN. LC. device must respond at high speed.

As described above, the matrix TN. LC. device of high multiplex drive must have:
(1) a $\gamma$ characteristic close to 1;
(2) a wide viewing angle; and
(3) a high response speed.

The $\gamma$ characteristic is studied by M. Schadt et al. According to their studies, the $\gamma$ value representing the steepness of the voltage-luminance characteristic is given by the following equation (I) and coincides well with the characteristic of an actual device:

$$\gamma = V_{50}/V_C = [2.044 - 1.044/(1 + K_{33}/K_{11})] \cdot \{(1 + 0.123[(\Delta\epsilon/\epsilon\perp)^{0.6} - 1]\} \cdot [1 + 0.132\ln(\Delta n \cdot d/2\lambda)] \quad (I)$$

where
$V_{50}$: the applied voltage when a transmittivity of 50% is obtained
$V_C$: the threshold voltage
$K_{11}$: the splay elastic constant of the liquid crystal
$K_{33}$: the bending elastic constant of the liquid crystal
$\Delta\epsilon$: the dielectric anisotropy of the liquid crystal
$\epsilon\perp$: the dielectric constant in a direction perpendicular to a liquid crystal molecular axis
$\Delta n$: the optical anisotropy of the liquid crystal
$d$: the liquid crystal layer thickness
$\lambda$: the wavelength of light According to equation (I), it is apparent that when the first, second, and third terms of equation (I) are close to 1, the $\gamma$ value is close to 1. Therefore, in order to improve the $\gamma$ value characteristic, the following conditions must be simultaneously satisfied:

(a) a ratio (to be referred to as elastic constant ratio $K_{33}/K_{11}$ hereinafter) of bending elastic constant $K_{33}$ to splay elastic constant $K_{11}$ is small;

(b) a ratio (to be referred to as dielectric ratio $\Delta\epsilon/\epsilon\perp$ hereinafter) of dielectric anisotropy $\Delta\epsilon$ to the dielectric constant in a direction perpendicular to the liquid crystal molecular axis; and (c) a value of product $\Delta n \cdot d$ of liquid crystal optical anisotropy $\Delta n$ and liquid crystal layer thickness d is 1.1 ($\mu$m) when a wavelength of incident light is 550 nm.

Dependency (to be referred to as a viewing angle characteristic hereinafter) of the contrast to an observing direction is studied by Mr. G. BAUR and reported in "The influence of Material and Device Parameters on the Optical Characteristics of Liquid Crystal Displays", Molecula Crystals and Liquid Crystals, Volume 63, Nos. 1 to 4, 1981. According to this report, the viewing angle characteristic depends on liquid crystal layer thickness d and liquid crystal optical anisotropy $\Delta n$ of a liquid crystal. That is, in a liquid crystal display device having large product $\Delta n \cdot d$ (to be referred to as $\Delta n \cdot d$ hereinafter) of layer thickness d and optical anisotropy $\Delta n$, an apparent change rate of $\Delta n \cdot d$ obtained when the liquid crystal display device is viewed from its front and in an oblique direction is large, resulting in a poor viewing angle characteristic. To the contrary, a liquid crystal display device having small $\Delta n \cdot d$ has a good viewing angle characteristic. In addition, when liquid crystal display devices having equal $\Delta n \cdot d$ are compared, a better viewing angle characteristic is obtained with smaller optical anisotropy $\Delta n$ of the liquid crystal. That is, a better viewing angle characteristic is obtained when a change in contrast with respect to a change in observing direction is small. Therefore, in order to improve the viewing angle characteristic:

(d) $\Delta n \cdot d$ must be reduced; and
(e) $\Delta n$ must be reduced.

As for the response characteristic, response time $t_{ON}$ required for turning on the liquid crystal display device and response time $t_{OFF}$ required for turning off the liquid crystal display device are represented by the following logic equations (II) and (III), respectively, and coincide well with measurement values:

$$t_{ON} = \eta/(\epsilon_0 \Delta\epsilon E^2 - Kq^2) \quad (II)$$

$$t_{OFF} = \eta/Kq^2 \quad (III)$$

where
$q = \pi/d$, $K = K_{11} + [(K_{33} - 2K_{22})/4]$
$\eta$: viscosity
$\epsilon_0$: dielectric field intensity
E: electric field intensity
$K_{22}$: torsional (twist) elastic constant According to equations (II) and (III), the response speed depends on viscosity $\eta$ and electric field intensity E. That is, in order to increase the response speed:

(f) viscosity $\eta$ must be reduced; and
(g) the electric field intensity must be increased.

Therefore, in order to obtain a steep $\gamma$ characteristic, the conventional liquid crystal display device has been designated to satisfy condition (c) concerning $\Delta n \cdot d$ of conditions (a) to (c). That is, a value of $\Delta n \cdot d$ is set to be 1.1 ($\mu$m) because the center of a wavelength range of a visual light beam is about 550 nm. However, conditions (a) and (b) are not sufficiently taken into consideration. The reasons for this are as follows. That is, in order to reduce $\Delta\epsilon/\epsilon\bot$ of condition (b), a value of $\Delta\epsilon$ may be reduced. In this case, however, a response speed in reduced. In addition, since a liquid crystal composition in which $K_{33}/K_{11}$ of condition (a) is reduced has high viscosity, a smectic phase is easily generated. As a result, the response speed is reduced, and an operation temperature range is narrowed.

Optical anisotropy $\Delta n$ of the conventional liquid crystal composition generally falls within the range of 0.13 to 0.16. Therefore, if the $\Delta n \cdot d$ value is set to be 1.1 ($\mu$m), liquid crystal layer thickness (interelectrode gap) d falls within the range of 7.0 to 8.8 ($\mu$m). In this case, since layer thickness d is large, the intensity of an electric field is reduced to reduce the response speed. In addition, a viewing angle characteristic is poor because $\Delta n \cdot d$ is large.

In order to increase the response speed, a liquid crystal composition used in the above conventional liquid crystal display device has a cyano group at its terminal end. In this liquid crystal composition, a large amount of a liquid crystal compound in which a value of dielectric anisotropy $\Delta\epsilon$ is largely positive is mixed to increase the dielectric anisotropy $\Delta\epsilon$ value of the liquid crystal composition. In addition, a large amount of a liquid crystal compound having a large optical anisotropy $\Delta n$ value is mixed to increase an optical anisotropy $\Delta n$ value of the liquid crystal composition. Furthermore, a value of liquid crystal layer thickness d of the liquid crystal display device is reduced to increase the electric field intensity, and the value of $\Delta n \cdot d$ is set to be 1.1 ($\mu$m) ($\lambda = 550$ nm) to obtain a good $\gamma$ characteristic, i.e., high contrast and a large operating margin.

However, in the above conventional liquid crystal composition, the $\Delta\epsilon/\epsilon\bot$ value is, e.g., 1.1 or more because the value of $\epsilon\bot$ is small. In addition, in order to prevent low viscosity and a smectic phase, a mixing ratio of a liquid crystal compound with which a low-viscosity liquid crystal and a stable smectic phase can be obtained is increased. Therefore, the value of elastic constant ratio $K_{33}/K_{11}$ is, e.g., 1.2 to 1.3 or more.

As described above, since the conventional liquid crystal composition has large $\Delta\epsilon/\epsilon\bot$ and $K_{33}/K_{11}$ values, it is difficult to improve the $\gamma$ characteristic of the liquid crystal display device using this liquid crystal composition. In addition, since the $\Delta n \cdot d$ value is large, it is difficult to improve the viewing angle characteristic.

SUMMARY OF THE INVENTION

The present invention has been made in consideration of the above situation and has as its object to provide a liquid crystal composition having small elastic constant ratio $K_{33}/K_{11}$ and dielectric ratio $\Delta\epsilon/\epsilon\bot$ in order to improve a $\gamma$ characteristic, a viewing angle characteristic, and/or a response speed of a liquid crystal display device which is driven in a multiplex manner and to provide a liquid crystal display device using the above liquid crystal composition.

In order to achieve the above object of the present invention, a liquid crystal composition according to the present invention comprises:

20 wt % to 70wt % of a first liquid crystal material consisting of at least one liquid crystal compound represented by formula

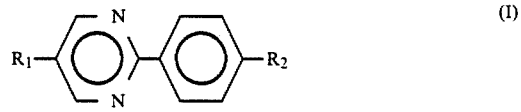

(wherein $R_1$ represents a linear alkyl group having 2 to 9 carbon atoms and $R_2$ represents a linear alkyl group or alkoxy group having 2 to 9 carbon atoms);

30 wt % to 80 wt % of a third liquid crystal material consisting of at least one liquid crystal compound in which a value of a dielectric anisotropy $\Delta\epsilon$ is negative or substantially "0"; and optionally, not more than 10 wt % of a second liquid crystal material consisting of at least one liquid crystal compound having a positive dielectric anisotropy $\Delta\epsilon$, and a liquid crystal display device according to the present invention comprises:

a pair of substrates having electrodes, inner surfaces of which oppose each other; and the liquid crystal composition of the present invention interposed between the pair of substrates.

A mixing ratio of a pyrimidine liquid crystal compound having large splay elastic constant $K_{11}$ and small elastic constant ratio $K_{33}/K_{11}$ is large in the liquid crystal composition of the present invention. Therefore, the value of elastic constant ratio $K_{33}/K_{11}$ of the entire liquid crystal composition is small. In addition, in the liquid crystal composition of the present invention, a pyrimidine liquid crystal compound in which the value of dielectric anisotropy $\Delta\epsilon$ is slightly positive and a low-viscosity liquid crystal compound and a high-temperature liquid crystal compound in which the value of dielectric constant $\epsilon\bot$ in a direction perpendicular to a liquid crystal molecular axis is large and the valve of dielectric anisotropy $\Delta\epsilon$ is negative or substantially 0 are mixed. A liquid crystal compound in which the value of dielectric anisotropy $\Delta\epsilon$ is largely positive is not mixed at all or mixed in a very small amount if necessary. Therefore, the liquid crystal composition of the present invention has small dielectric ratio $\Delta\epsilon/\epsilon\bot$ and low viscosity.

In the liquid crystal display device using the liquid crystal composition of the present invention, since elastic constant ratio $K_{33}/K_{11}$ and dielectric ratio $\Delta\epsilon/\epsilon\bot$ are small, the best $\gamma$ characteristic can be obtained when the value of $\Delta n \cdot d$ is smaller than 1.1. As a result, high contrast, a large operating margin, and a high response speed can be obtained. In addition, since the value of $\Delta n \cdot d$ is small, the viewing angle characteristic can be improved. Furthermore, the response speed can be improved because liquid crystal layer thickness d can be reduced.

BRIEF DESCRIPTION OF THE DRAWINGS

FIGS. 4A and 4B are views for explaining a relationship between orienting directions of oriented films and directions of polarizing axes of polarizing plates of the liquid crystal display device shown in FIG. 2; and FIG. 5 is a perspective view for defining a viewing angle characteristic.

DETAILED DESCRIPTION OF THE PREFERRED EMBODIMENT

Figure 1:
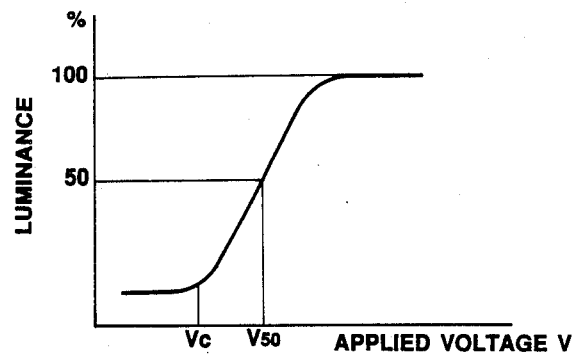
FIG. 1 is a graph showing a luminance-voltage characteristic for defining a γ characteristic of a liquid crystal display device.

A preferred embodiment of a liquid crystal composition according to the present invention will be described in detail below.

A liquid crystal composition of the present invention mainly consists of a pyrimidine liquid crystal compound in which the value of elastic constant ratio $K_{33}/K_{11}$ is small and the value of dielectric anisotropy $\Delta\epsilon$ is 0 or slightly positive. In addition, at least one of a high-temperature liquid crystal for widening a temperature range showing a nematic phase, a low-viscosity liquid crystal for reducing a viscosity, and the like as an $N_n$ liquid crystal compound in which the value of dielectric anisotropy $\Delta\epsilon$ is substantially 0 or negative is mixed in the liquid crystal composition such that dielectric anisotropy $\Delta\epsilon$ of the entire composition becomes a positive value smaller than 3. Alternatively, the liquid crystal composition of the present invention can be achieved by mixing, in addition to the above composition, a small amount of an $N_p$ liquid crystal in which the value of dielectric anisotropy $\Delta\epsilon$ is largely positive such that dielectric anisotropy $\Delta\epsilon$ of the entire composition becomes positive. The values of elastic constant ratio $K_{33}/K_{11}$ and dielectric ratio $\Delta\epsilon/\epsilon\perp$ of the liquid crystal composition mixed as described above can be reduced by using a large amount of a liquid crystal compound having very large splay elastic constant $K_{11}$ and mixing a large amount of a liquid crystal compound having very large dielectric constant $\epsilon\perp$ in a direction perpendicular to a liquid crystal molecular axis.

In addition, according to a liquid crystal display device using a liquid crystal composition having small elastic constant ratio $K_{33}/K_{11}$ and dielectric ratio $\Delta\epsilon/\epsilon\perp$ such as the liquid crystal composition of the present invention, the best γ characteristic can be obtained by a range of $\Delta n \cdot d$ not satisfying equation (I). As a result, excellent characteristics such as high contrast, a large operating margin, a wide viewing angle characteristic, and a high response speed can be obtained.

The liquid crystal composition of the present invention will be described in more detail below.

The pyrimidine liquid crystal compound has an alkyl or alkoxy group at its terminal end. The value of elastic constant ratio $K_{33}/K_{11}$ of the compound is as small as about 0.55, and the value of $K_{11}$ is as large as $18 \times 10^{-12}$. An example of such a liquid crystal compound is a compound represented by formula (I), and its physical characteristics are summarized in Table 1 below:

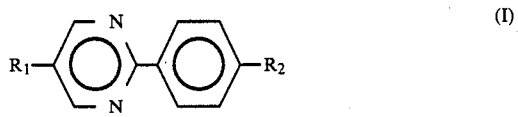
(I)

(wherein $R_1$ represents a linear alkyl group having 2 to 9 carbon atoms and $R_2$ represents a linear alkyl group or alkoxy group having 2 to 9 carbon atoms.)

TABLE 1

| Liquid Crystal Compound | m.p. | c.p. | Δn | Δε | Viscosity |
|---|---|---|---|---|---|
| (I) $R_1$—[pyrimidine]—[phenyl]—$R_2$ | 30~50° C. | 70° C. or less | 0.15 or less | 0~5 | 30 cp or more |

In a liquid crystal compound represented by formula (I), dielectric anisotropy $\Delta\epsilon$ is slightly positive. At least one of such compounds is mixed to prepare a first liquid crystal.

The $N_p$ liquid crystal compound has a cyano group at its terminal end and large positive dielectric anisotropy $\Delta\epsilon$. Examples of the $N_p$ liquid crystal compound are pyrimidine, phenylcyclohexane, dioxane, and biphenyl liquid crystal compounds. In these liquid crystal compounds, since the value of $\Delta\epsilon$ is as very large as 10 to 30, the value of dielectric anisotropy $\Delta\epsilon$ of the liquid crystal composition becomes positive. Physical characteristics of these compounds are summarized in Table 2 below. Liquid crystal compounds as listed in Table 2 can be used as the $N_p$ liquid crystal compound.

TABLE 2

| Liquid Crystal Compound | m.p (°C.) | c.p (°C.) | Δn | Δε | Viscosity (cp) |
|---|---|---|---|---|---|
| (II) $R_3$—[pyrimidine]—[phenyl]—CN | 45~70 | 50~60 | 0.15 or more | 20~30 | 30 or more |

TABLE 2-continued

| Liquid Crystal Compound | m.p (°C.) | c.p (°C.) | $\Delta n$ | $\Delta \epsilon$ | Viscosity (cp) |
|---|---|---|---|---|---|
| (III) $R_4$—[H]—[O]—CN | 30~40 | 4~55 | 0.11~0.13 | 10~14 | 20~30 |
| (II) $R_5$—(O,O)—[O]—CN | 40~60 | 35~50 | 0.13~0.14 | 30 | 30~40 |
| (II) $R_6$—[O]—[O]—CN | 75 | 22 | 0.19 | 13 | 22 |

(wherein $R_3$ represents a linear alkyl group having 4 to 7 carbon atoms, $R_4$ represents a propyl group, $R_5$ represents a linear alkyl group having 3 to 5 carbon atoms, and $R_6$ represents an ethyl group.)

Of the liquid crystal compounds listed in Table 2, a pyrimidine liquid crystal compound represented by formula (II) has small elastic constant ratio $K_{33}/K_{11}$ and therefore is effective to reduce the value of elastic constant ratio $K_{33}/K_{11}$ of the entire liquid crystal composition. At least one of the liquid crystal compounds listed in Table 2 is used to prepare a second liquid crystal material.

Examples of the $N_n$ crystal compound are estercyclohexane, phenylcyclohexane, and biphenylcyclohexane liquid crystal compounds. These compounds consist of a low-viscosity liquid crystal compound for adjusting viscosity, a high-temperature liquid crystal compound for widening a temperature range showing a nematic phase, and the like. Examples of the low-viscosity liquid crystal compound are those having a viscosity of 20 to 10 or less as listed in Table 3 together with their physical characteristics.

TABLE 3

| Liquid Crystal Compound | m.p (°C.) | c.p (°C.) | $\Delta n$ | $\Delta \epsilon$ | Viscosity (cp) |
|---|---|---|---|---|---|
| (VI) $R_7$—[H]—COO—[O]—$R_8$ | 35~50 | 40~80 | 0.08~0.10 | −1 | 13~20 |
| (VII) $R_9$—[H]—[O]—$R_{10}$ | 50 or less | 50 or less | 0.08~0.10 | ~0 | 4~10 |
| (XV) $R_{25}$—[H]—[H]—$R_{26}$ | — | 20~60 | 0.06 or less | ~0 | 10 or less |

(wherein $R_7$ represents a linear alkyl group having 2 to 5 carbon atoms, $R_8$ represents a linear alkyl group or alkoxy group having 1 to 5 carbon atoms, $R_9$ represents an alkyl group having 3 to 5 carbon atoms, $R_{10}$ represents a linear alkyl group or alkoxy group having 1 to 4 carbon atoms, $R_{25}$ represents a propyl group, and $R_{26}$ represents an ethoxy group.)

Of the above liquid crystal compounds listed in Table 3, a liquid crystal compound represented by formula (VI) has a very large $\epsilon\perp$ value and therefore is effective to reduce the value of $\Delta\epsilon/\epsilon\perp$. Since any of the above liquid crystal compounds has a small $\Delta n$ value, the $\Delta n$ value of the liquid crystal composition is not increased.

Examples of the high-temperature liquid crystal compound are liquid crystal compounds in which a dislocation temperature between a nematic phase and an isotropic liquid and a C.P. temperature (clearing point temperature) are about 60° C. to 190° C. as listed in Table 4 together with their physical characteristics.

TABLE 4

| Liquid Crystal Compound | m.p (°C.) | c.p (°C.) | $\Delta n$ | $\Delta \epsilon$ | Viscosity |
|---|---|---|---|---|---|
| (VIII) $R_{11}$—[H]—[O]—OOC—[H]—$R_{12}$ | 40~65 | 190° C. or more | 0.11 | −1 | 40 |

TABLE 4-continued

| Liquid Crystal Compound | m.p (°C.) | c.p (°C.) | $\Delta n$ | $\Delta\epsilon$ | Viscosity |
|---|---|---|---|---|---|
| (IX) 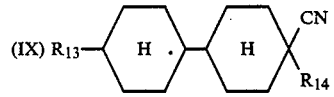 | 24~28 | 60~70 | 0.03 | −8 or less | 70~80 |
| (X) 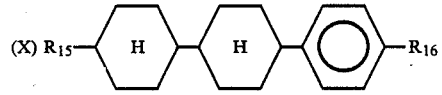 | 30~80 | 160° C. or more | 0.12 | ~0 | 20 |
| (XI) 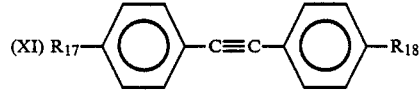 | 100° C. or less | 100° C. or less | 0.20 or more | ~0 | 30 or less |
| (XII) 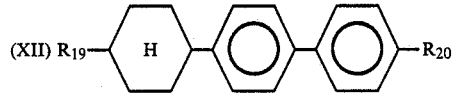 | 70° C. or less | 160° C. or more | 0.18 | ~0 | 20 |
| (XIII) 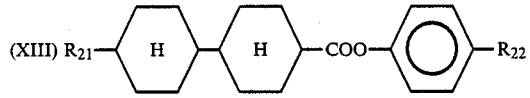 | 70° C. or less | 180° C. or more | 0.09 0.12 | — | 20~30 |
| (XIV) 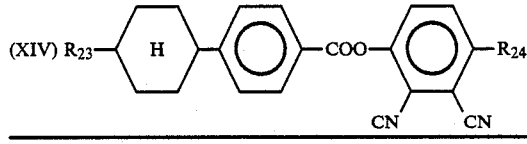 | — | 120° C. or more | — | −20 | 80 or more |

(wherein $R_{11}$ represents a propyl group, each of $R_{12}$ and $R_{13}$ independently represents a linear alkyl group having 4 or 5 carbon atoms, $R_{14}$ represents a linear alkyl group having 5 to 7 carbon atoms, $R_{15}$ represents a propyl group, $R_{16}$ represents a linear alkyl group having 1 to 3 carbon atoms, $R_{17}$ represents a linear alkyl group having 3 to 5 carbon atoms, $R_{18}$ represents an alkoxy group having 1 or 2 carbon atoms, $R_{19}$ represents a pentyl group, $R_{20}$ represents an ethyl group, $R_{21}$ represents a linear alkyl group having 3 or 4 carbon atoms, $R_{22}$ represents a linear alkyl group having 3 to 5 carbon atoms, $R_{23}$ represents a linear alkyl group having 3 or 4 carbon atoms, and $R_{24}$ represents a linear alkyl group having 2 to 4 carbon atoms.)

At least one of the liquid crystal compounds listed in Tables 3 and 4 is used to prepare a third liquid crystal material.

The liquid crystal composition of the present invention is achieved by mixing at least the first and third liquid crystal materials of the first, second, and third liquid crystal materials. In order to effectively reduce elastic constant ratio $K_{33}/K_{11}$, 20 wt % or more of the first liquid crystal material is mixed. However, if only the first liquid crystal material is used, the viscosity is increased too high, and an operation temperature range is narrowed. Therefore, 30 wt % or more of the third liquid crystal material is mixed. That is, 20 to 70 wt % of the first liquid crystal material is mixed. Preferably, mixing ratios of the first and third liquid crystal materials are 24 to 54 wt % and 46 to 76 wt %, respectively. In this case, the third liquid crystal material essentially consists of at least one liquid crystal compound represented by formula (VI) and at least one liquid crystal compound represented by at least one of formulas (VIII), (IX), (X), and (XI) and optionally consists of a liquid crystal compound represented by formula (VII). Preferable mixing ratios of the liquid crystal compounds represented by formulas (VI), (VII), (VIII), (IX), (X), and (XI) are 8 to 60 wt %, 15 to 22 wt %, 12 to 18 wt %, 4 to 8 wt %, 7 to 25 wt %, and 2 to 4 wt %, respectively.

More preferably, the third liquid crystal material is prepared by mixing at least one liquid crystal compound represented by formula (VI) and at least one liquid crystal compound represented by formula (VIII), and if necessary, a liquid crystal compound represented by formula (IX) having a large negative $\Delta\epsilon$ value. In this case, mixing ratios of the liquid crystal compounds represented by formulas (I), (VI), (VIII), and (IX) are 26 to 30 wt %, 50 to 60 wt %, 12 to 18 wt %, and 8 wt % or less, respectively. In the third liquid crystal material, in addition to the liquid crystal compound represented by formula (VI), a liquid crystal compound represented by formula (X), and if necessary, a liquid crystal compound represented by formula (VII) having low viscosity and a liquid crystal compound represented by formula (XI) having a large $\Delta n$ value are mixed. In this case, mixing ratios of the liquid crystal compounds represented by formulas (I), (VI), (X), (VII), and (XI) are preferably 42 to 54 wt %, 12 to 35 wt %, 7 to 25 wt %, 22 wt % or less, and 4 wt % or less, respectively.

The liquid crystal composition of the present invention is achieved by mixing the first liquid crystal material for reducing elastic constant ratio $K_{33}/K_{11}$, the second liquid crystal material for obtaining a positive dielectric anisotropy $\Delta\epsilon$ of the entire liquid crystal composition, and the third liquid crystal material for reducing the viscosity and widening an operation temperature range. In this case, a mixing ratio of the first liquid crystal material is set to be 20 to 65 wt % in order to obtain a sufficient effect for reducing elastic constant ratio $K_{33}/K_{11}$, that of the second liquid crystal material is set to be 10 wt % or less so that the value of dielectric anisotropy $\Delta\epsilon$ is not unnecessarily increased to reduce the $\Delta\epsilon/\epsilon\perp$ value, and that of the third liquid crystal material is set to be 30 to 75 wt %. As the second liquid crystal material, it is preferable to use a liquid crystal compound represented by formula (II) having a cyano group at its terminal end because a pyrimidine liquid crystal compound has small elastic constant ratio $K_{33}/K_{11}$. In this case, a mixing ratio of the liquid crystal compound represented by formula (II) is preferably 5 wt % of less.

The third liquid crystal material is prepared by mixing at least one of the liquid crystal compounds represented by formulas (VI), (VII), and (XV) and at least one of the liquid crystal compounds represented by formulas (VIII), (IX), (X), (XI), and (XIV). Mixing ratios of the liquid crystal compounds represented by formulas (VI), (VII), (VIII), (IX), (X), (XI), (XIV), and (XV) are 6 to 62 wt %, 8 to 27 wt %, 10 to 20 wt %, 3 to 22 wt %, 2 to 25 wt %, 1 to 22 wt %, 5 to 12 wt %, and 15 to 20 wt %, respectively. That is, in the third liquid crystal material, a liquid crystal compound represented by formula (VI) and/or a liquid crystal compound represented by formula (VII), and a liquid crystal compound represented by formula (X) and/or a liquid crystal compound represented by formula (XI) are preferably mixed. Of the liquid crystal compounds represented by formulas (VI) and (VII), when only a liquid crystal compound represented by formula (VI) is used, liquid crystal compounds represented by formulas (VIII) and (IX) or those represented by formulas (X) and (XI) are selectively mixed. When both of the liquid crystal compounds represented by formulas (VI) and (VII) are used, liquid crystal compounds represented by formulas (VIII) and (IX), that represented by formula (X), or those represented by formulas (X) and (XI) are mixed. In addition, liquid crystal compounds represented by formulas (IX), (X), and (XI), and if necessary, that represented by formula (XIV) are selectively mixed. Mixing ratios of the liquid crystal compounds represented by formulas (VI), (VII), (VIII), (IX), (X), (XI), and (XIV) are preferably 6 to 60 wt %, 8 to 27 wt %, 10 to 20 wt %, 3 to 22 wt %, 2.5 to 22 wt %, 1 to 13 wt %, and 5 to 11 wt %, respectively. More preferably, the mixing ratios of the liquid crystal compounds represented by formulas (X), (XI), and (XIV) are 2.5 to 22 wt %, 1 to 13 wt %, and 5 to 11 wt %, respectively.

When the mixing ratio of the second liquid crystal material represented by formula (II) is 5 to 10 wt %, those of the liquid crystal material represented by formula (I) and the liquid crystal compounds represented by formulas (VI) and (VII) are preferably 20 to 30 wt %, 30 to 45 wt %, and 14 to 20 wt %, respectively. In addition, it is preferable to selectively mix 10 to 21 wt % and 5 to 11 wt % of the liquid crystal compounds represented by formulas (IX) and (XIV), respectively.

When a liquid crystal compound represented by formula (III) is used in the second liquid crystal material, the third liquid crystal material is prepared by mixing liquid crystal compounds represented by formulas (VI), (VII), and (VIII). Mixing ratios of the first and second liquid crystal materials represented by formulas (I) and (III) are preferably 20 to 32 wt % and 3 to 7 wt %, respectively, and those of the liquid crystal compounds represented by formulas (VI), (VII), and (VIII) of the third liquid crystal material are preferably 42 to 52 wt %, 8 wt % or less, and 18 to 25 wt %, respectively.

When a liquid crystal compound represented by formula (IV) is used as the second liquid crystal material, the third liquid crystal material is prepared by selectively mixing liquid crystal compounds represented by formulas (VI), (VIII), (X), (XII), and (XIV) in the liquid crystal compound represented by formula (VII). Mixing ratios of the first and second liquid crystal materials are preferably 40 to 45 wt % and 2 to 7 wt %, respectively, and that of the liquid crystal compound represented by formula (VII) of the third liquid crystal material is preferably 20 to 22 wt %. In addition, it is preferable to mix 10 to 12 wt %, substantially 19 wt %, 18 to 22 wt %, substantially 2 wt %, and substantially 10 wt % of the liquid crystal compounds represented by formulas (VI), (VIII), (X), (XII), and (XIV), respectively.

When a liquid crystal compound represented by formula (V) is used as the second liquid crystal material, the third liquid crystal material is prepared by mixing liquid crystal compounds represented by formulas (VI), (VII), (XII), and (XIII). Mixing ratios of the first and second liquid crystals materials are preferably substantially 36 wt % and substantially 1 wt %, respectively, and those of the liquid crystal compounds represented by formulas (VI), (VII), (XII), and (XIII) are preferably substantially 15 wt %, substantially 24 wt %, 8 to 11 wt %, and 13 to 16 wt %, respectively.

When liquid crystals compounds represented by formulas (II) and (V) are used as the second liquid crystal material, the third liquid crystal material is prepared by mixing liquid crystal compounds represented by formulas (VI), (VII), (X), and (XI). A mixing ratio of the first liquid crystal material is preferably substantially 44 wt %, those of the liquid crystal compounds represented by formulas (II) and (V) of the second liquid crystal material are preferably substantially 2 wt %, respectively, and those of the liquid crystal compounds represented by formulas (VI), (VII), (X), and (XI) of the third liquid crystal material are preferably substantially 17 wt %, substantially 20 wt %, substantially 14 wt %, and substantially 1 wt %, respectively.

[EXAMPLES]

The liquid crystal composition of the present invention will be described in detail below by way of its examples.

Examples 1 to 9 prepared by mixing only the first and third liquid crystal materials are listed in Tables 5 and 6. In Table 6, MIX-11 and MIX-12 are mixtures of a plurality of liquid crystal compounds represented by formula (I) in Table 7. In compositions of Examples 1 to 4, a low-viscosity liquid crystal compound and a high-temperature liquid crystal compound represented by formulas (VI) and (VIII), respectively, are mixed as the third liquid crystal material, and a liquid crystal compound represented by formula (IX) in which a dielectric anisotropy value is negatively large is selectively mixed in order to adjust $\Delta\epsilon$ and $\Delta\epsilon/\epsilon\perp$ values. Since the value of $\epsilon\perp$ of the liquid crystal compound represented by formula (VI) is large, the $\Delta\epsilon/\epsilon\perp$ value can be reduced without greatly reducing the $\Delta\epsilon$ value. In compositions of Examples 5 to 8, low-viscosity liquid crystal compounds represented by formulas (VI) and (VII) and a high-temperature liquid crystal compound represented by formula (X) are mixed as the third liquid crystal material, and a liquid crystal compound represented by formula (XI) having a large optical anisotropy Δn value is selectively mixed in order to adjust Δn of the composition. Since the liquid crystal compound represented by formula (VII) has very low viscosity, the viscosity of the composition can be significantly reduced. In a composition of Example 9, a large amount of a liquid crystal compound represented by formula (VI) having a large ε⊥ value is mixed as the third liquid crystal material, and a liquid crystal compound represented by formula (XI) having large Δn is mixed as the high-temperature liquid crystal compound. Therefore, the liquid crystal composition of Example 9 has a large Δn value and a small Δε/ε⊥ value.

The liquid crystal compositions of Examples 1 to 9 have positive dielectric anisotropy Δε values because the liquid crystal compounds represented by formula (I) used in the first liquid crystal material have positive dielectric anisotropy Δε values.

TABLE 5

| Liquid Crystal Material | General Formula | Composition (% by weight) Example No. | 1 | 2 | 3 | 4 |
|---|---|---|---|---|---|---|
| First Liquid Crystal Material | I | 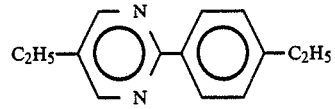 | 8 | 8 | 8 | 7 |
| | | 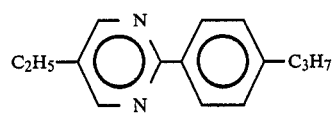 | 10 | 10 | 10 | 8 |
| | | 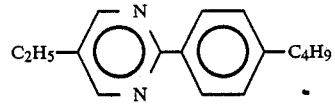 | 10 | 12 | 10 | 9 |
| | | Total | (28) | (30) | (28) | (26) |
| Third Liquid Crystal Material | VI | 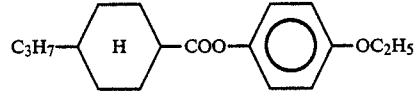 | 25 | 24 | 22 | 25 |
| | | 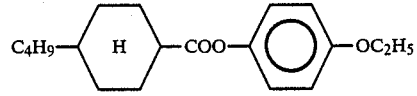 | 20 | 18 | 16 | 20 |
| | | 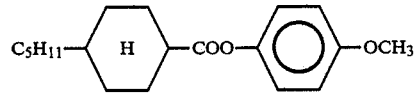 | 15 | 10 | 12 | 15 |
| Third Liquid Crystal Material | VI | Total | (60) | (52) | (50) | (60) |
| | VIII | 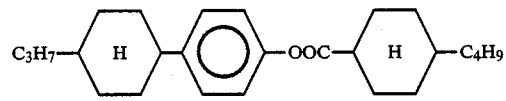 | 6 | 6 | 7 | 6 |
| | | 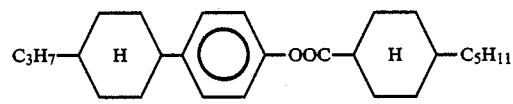 | 6 | 12 | 7 | 6 |
| | | Total | (12) | (18) | (14) | (12) |
| | IX | 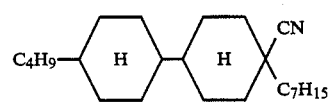 | — | — | 4 | — |

TABLE 5-continued

| Liquid Crystal Material | General Formula | Composition (% by weight) Example No. | 1 | 2 | 3 | 4 |
|---|---|---|---|---|---|---|
| | | 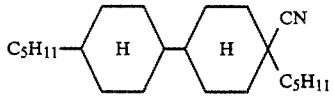 $C_5H_{11}$—H—H—$\overset{CN}{\underset{C_5H_{11}}{|}}$ | — | — | 4 | 4 |
| | | Total | (0) | (0) | (8) | (4) |

TABLE 6

| Liquid Crystal Material | General Formula | Composition (% by weight) Example No. | 5 | 6 | 7 | 8 | 9 |
|---|---|---|---|---|---|---|---|
| First Liquid Crystal Material | I | $C_6H_{13}$—(N=N)—()—$OC_6H_{13}$ | 4 | — | 6 | — | — |
| | | $C_6H_{13}$—(N=N)—()—$OC_7H_{15}$ | 4 | — | — | — | — |
| | | $C_6H_{13}$—(N=N)—()—$OC_9H_{19}$ | 4 | — | — | — | — |
| | | $C_6H_{13}$—(N=N)—()—$OC_{11}H_{23}$ | 4 | — | 4 | — | 12 |
| | | $C_7H_{15}$—(N=N)—()—$OC_7H_{15}$ | 4 | 8 | 6 | 8 | |
| | | $C_7H_{15}$—(N=N)—()—$OC_9H_{19}$ | 4 | 8 | 6 | 8 | 10 |
| | | $C_9H_{19}$—(N=N)—()—$OC_6H_{13}$ | 4 | 8 | 6 | 8 | 10 |
| First Liquid Crystal Material | I | $C_9H_{19}$—(N=N)—()—$OC_9H_{19}$ | 4 | 8 | — | 8 | 12 |
| | | Mix-11 | — | — | 5 | — | 10 |
| | | Mix-12 | 12 | 14 | 18 | 10 | — |
| | | Total | (44) | (46) | (51) | (42) | (54) |
| Third Liquid Crystal Material | VI | $C_3H_7$—H—COO—()—$OC_2H_5$ | — | — | 5 | — | — |
| | | $C_4H_9$—H—COO—()—$OC_2H_5$ | — | — | 3 | — | — |

TABLE 6-continued

| Liquid Crystal Material | General Formula | Example No. | Composition (% by weight) 5 | 6 | 7 | 8 | 9 |
|---|---|---|---|---|---|---|---|
| | | C5H11—(H)—COO—(O)—OC5H11 | 12 | 14 | — | 26 | — |
| Third Liquid Crystal Material | VI | Mix-31 | — | — | — | — | 35 |
| | | Total | (12) | (14) | (8) | (26) | (35) |
| | VII | C3H7—(H)—(O)—OCH3 | — | — | 8 | — | — |
| | | C3H7—(H)—(O)—OC2H5 | 22 | 20 | 6 | 15 | — |
| | | C5H11—(H)—(O)—C3H7 | — | — | 2 | — | — |
| | | Total | (22) | (20) | (16) | (15) | (0) |
| | X | C3H7—(H)—(H)—(O)—CH3 | 22 | 20 | 15 | 15 | 7 |
| Third Liquid Crystal Material | X | C3H7—(H)—(H)—(O)—C3H7 | — | — | 10 | — | — |
| | | Total | (22) | (20) | (25) | (15) | (7) |
| | XI | C3H7—(O)—C≡C—(O)—OC2H5 | — | — | — | 2 | 4 |
| | | Total | (0) | (0) | (0) | (2) | (4) |

TABLE 7

| MIX. No. | Composition of Mixed Liquid Crystals (parts by weight) | MIX-11 | MIX-12 | MIX-13 | MIX-14 |
|---|---|---|---|---|---|
| C2H5—(N◯N)—(O)—C2H5 | | 1 | — | — | — |
| C2H5—(N◯N)—(O)—C3H7 | | 1 | — | — | — |
| C2H5—(N◯N)—(O)—C4H9 | | 1 | — | — | — |
| C4H9—(N◯N)—(O)—C3H7 | | 1 | — | — | — |

TABLE 7-continued

Composition of Mixed Liquid Crystals (parts by weight)

| MIX. No. | Structure | MIX-11 | MIX-12 | MIX-13 | MIX-14 |
|---|---|---|---|---|---|
| | $C_4H_9$–pyrazine–phenyl–$C_4H_9$ | — | 1 | — | — |
| | $C_4H_9$–pyrazine–phenyl–$C_5H_{11}$ | — | 1 | — | — |
| | $C_5H_{11}$–pyrazine–phenyl–$C_3H_7$ | — | 1 | — | — |
| | $C_5H_{11}$–pyrazine–phenyl–$C_4H_9$ | — | 1 | — | — |
| | $C_5H_{11}$–pyrazine–phenyl–$C_5H_{11}$ | — | 1 | — | — |
| | $C_5H_{11}$–pyrazine–phenyl–$OC_6H_{13}$ | — | 1 | — | — |
| | $C_6H_{13}$–pyrazine–phenyl–$OC_5H_{11}$ | — | — | 1 | 1 |
| | $C_6H_{13}$–pyrazine–phenyl–$OC_6H_{13}$ | — | — | 1 | 1 |
| | $C_6H_{13}$–pyrazine–phenyl–$OC_7H_{15}$ | — | — | 1 | — |
| | $C_6H_{13}$–pyrazine–phenyl–$OC_9H_{19}$ | — | — | 1 | — |
| | $C_6H_{13}$–pyrazine–phenyl–$OC_{11}H_{23}$ | — | — | 1 | — |
| | $C_7H_{15}$–pyrazine–phenyl–$OC_6H_{13}$ | — | — | — | 1 |

TABLE 7-continued

| | Composition of Mixed Liquid Crystals (parts by weight) | | | |
|---|---|---|---|---|
| MIX. No. | MIX-11 | MIX-12 | MIX-13 | MIX-14 |
| $C_7H_{15}$—[pyrimidine]—[phenyl]—$OC_7H_{15}$ | — | — | 1 | — |
| $C_7H_{15}$—[pyrimidine]—[phenyl]—$OC_9H_{19}$ | — | — | 1 | — |
| $C_8H_{17}$—[pyrimidine]—[phenyl]—$OC_6H_{13}$ | — | — | — | 1 |
| $C_9H_{19}$—[pyrimidine]—[phenyl]—$OC_6H_{13}$ | — | — | 1 | — |
| $C_9H_{19}$—[pyrimidine]—[phenyl]—$OC_9H_{19}$ | — | — | 1 | — |

Examples 10 to 78 exemplify compositions of the present invention prepared by mixing the first, second, and third liquid crystal materials. In Examples 10 to 78, MIX-21 is a mixture of three pyrimidine liquid crystal compounds as shown in Table 8, MIX-22 is a mixture of three dioxane liquid crystal compounds as shown in Table 9, and MIX-31 is a mixture of seven estercyclohexane liquid crystal compounds as shown in Table 10.

Examples 10 to 66 in which a pyrimidine liquid crystal compound having a cyano group at its terminal end is used as the second liquid crystal material are listed in Tables 11 to 16. In Examples 10 to 17, liquid crystal compounds represented by formulas (VI), (VII), (VIII), (IX), and (XIV) are selectively mixed as the third liquid crystal compound. In Example 10, a mixing ratio of the liquid crystal material represented by formula (XIV) in which dielectric anisotropy $\Delta\epsilon$ is negatively large is increased, and that of the second liquid crystal material is relatively increased accordingly. In Example 11, a mixing ratio of the first liquid crystal material is especially increased to reduce elastic constant ratio $K_{33}/K_{11}$. In Examples 12 to 17, a mixing ratio of the liquid crystal compound represented by formula (VI) used as the third liquid crystal material and having a large $\epsilon\perp$ value is increased to reduce the $\Delta\epsilon/\epsilon\perp$ value.

In Examples 18 to 25 listed in Table 12, liquid crystal compounds represented by formulas (VI), (VII), and (X) are mixed as the third liquid crystal material. Since the liquid crystal compound represented by formula (VII) has very low viscosity, a low-viscosity liquid crystal composition can be prepared.

In Examples 26 to 30 listed in Table 13, liquid crystal compounds represented by formulas (VI) and (VII) are mixed, and liquid crystal compounds represented by formulas (IX) and (XIV) in which dielectric anisotropy $\Delta\epsilon$ is negatively large are selectively mixed, as the third liquid crystal material, and a mixing ratio of the second liquid material having a positive dielectric anisotropy $\Delta\epsilon$ is relatively increased accordingly. When the liquid crystal compounds in which the $\Delta\epsilon$ values are largely negative and positive are mixed as described above, the $\Delta\epsilon/\epsilon\perp$ value is reduced.

In Examples 31 to 51 listed in Table 14, liquid crystal compounds represented by formulas (VI), (VII), (X), and (XI) are mixed as the third liquid crystal material at different mixing ratios. In these examples, optical anisotropy $\Delta n$ of the resultant a composition is relatively large because the liquid crystal compound represented by formula (XI) having large optical anisotropy $\Delta n$ is mixed.

In Examples 52 to 61 listed in Table 15, liquid crystal compounds represented by formulas (VI), (VII), and (XI) are mixed, and liquid crystal compounds represented by formulas (IX), (X), and (XIV) are selectively mixed, as the third liquid crystal material. Since the liquid crystal compound represented by formula (XI) having large optical anisotropy $\Delta n$ is mixed, these compositions have large optical anisotropy $\Delta n$.

In Examples 62 to 66 listed in Table 16, the liquid crystal compounds represented by formulas (VI), (VII), (VIII), (IX), (X), (XI), and (XV) are selectively mixed as the third liquid crystal material. In these liquid crystal compositions, optical anisotropy $\Delta n$, the viscosity, and dielectric anisotropy $\Delta\epsilon$ are adjusted.

TABLE 8

| | Mixing Ratio (parts by weight) |
|---|---|
| Liquid Crystal Compound | MIX-21 |
| $C_4H_9$—[pyrimidine]—[phenyl]—CN | 1 |

TABLE 8-continued

| Liquid Crystal Compound | Mixing Ratio (parts by weight) MIX-21 |
|---|---|
| $C_5H_{11}$—[pyrimidine]—[phenyl]—CN | 1 |
| $C_7H_{15}$—[pyrimidine]—[phenyl]—CN | 1 |

TABLE 9

| Liquid Crystal Compound | Mixing Ratio (parts by weight) MIX-22 |
|---|---|
| $C_3H_7$—[dioxane]—[phenyl]—CN | 2 |
| $C_4H_9$—[dioxane]—[phenyl]—CN | 2 |
| $C_5H_{11}$—[dioxane]—[phenyl]—CN | 1 |

TABLE 10

| Liquid Crystal Compound | Mixing Ratio (parts by weight) MIX-31 |
|---|---|
| $C_3H_7$—H—COO—[phenyl]—$OC_2H_5$ | 1 |
| $C_3H_7$—H—COO—[phenyl]—$OC_4H_9$ | 1 |
| $C_4H_9$—H—COO—[phenyl]—$OCH_3$ | 1 |
| $C_4H_9$—H—COO—[phenyl]—$OC_2H_5$ | 1 |
| $C_4H_9$—H—COO—[phenyl]—$OC_4H_9$ | 1 |
| $C_5H_{11}$—H—COO—[phenyl]—$OCH_3$ | 1 |
| $C_5H_{11}$—H—COO—[phenyl]—$OC_2H_5$ | 1 |

TABLE 11

| Liquid Crystal Material | General Formula | Example No. | Composition (% by weight) | | | | | | | |
|---|---|---|---|---|---|---|---|---|---|---|
| | | | 10 | 11 | 12 | 13 | 14 | 15 | 16 | 17 |
| First Liquid Crystal Material | I | $C_2H_5$—[pyrimidine]—[phenyl]—$C_2H_5$ | — | — | 8 | 6 | 6 | 6 | 6 | — |
| | | $C_2H_5$—[pyrimidine]—[phenyl]—$C_3H_5$ | — | — | 9 | 8 | 8 | 7 | 7 | — |
| | | $C_2H_5$—[pyrimidine]—[phenyl]—$C_4H_9$ | — | — | 9 | 8 | 8 | 8 | 8 | — |
| | | $C_6H_{13}$—[pyrimidine]—[phenyl]—$OC_6H_{13}$ | — | — | — | — | — | — | — | 10 |
| | | $C_6H_{13}$—[pyrimidine]—[phenyl]—$OC_{11}H_{23}$ | — | — | — | — | — | — | — | 6 |

TABLE 11-continued

| Liquid Crystal Material | General Formula | Example No. | Composition (% by weight) | | | | | | | |
|---|---|---|---|---|---|---|---|---|---|---|
| | | | 10 | 11 | 12 | 13 | 14 | 15 | 16 | 17 |
| | | C$_9$H$_{19}$—[pyrazine]—[phenyl]—OC$_9$H$_{19}$ | — | — | — | — | — | — | — | 6 |
| First Liquid Crystal Material | (I) | Mix - 11 | 20 | — | — | — | — | — | — | 20 |
| | | Mix - 13 | 45 | — | — | — | — | — | — | — |
| | | Mix - 14 | — | 60 | — | — | — | — | — | — |
| | | Total | (65) | (60) | (26) | (22) | (22) | (21) | (21) | (42) |
| Second Liquid Crystal Material | (II) | Mix - 21 | 5 | 4 | 4 | 4 | 3 | 2 | 3 | 3 |
| Third Liquid Crystal Material | (VI) | C$_3$H$_7$—[H]—COO—[phenyl]—OC$_2$H$_5$ | — | — | 22 | 24 | 26 | 25 | 25 | 20 |
| | | C$_4$H$_9$—[H]—COO—[phenyl]—OC$_2$H$_5$ | — | — | 16 | 20 | 20 | 20 | 20 | 14 |
| | | C$_5$H$_{11}$—[H]—COO—[phenyl]—OCH$_3$ | — | — | 12 | 14 | 16 | 15 | 15 | 6 |
| Third Liquid Crystal Material | VI | Mix - 31 | — | 22 | — | — | — | — | — | — |
| | | Total | (0) | (22) | (50) | (54) | (62) | (60) | (60) | (40) |
| | VII | C$_3$H$_7$—[H]—[phenyl]—OC$_2$H$_5$ | — | — | — | — | — | — | — | 8 |
| | VIII | C$_3$H$_7$—[H]—[phenyl]—OOC—[H]—C$_4$H$_9$ | 10 | — | 6 | 6 | 5 | 6 | 4 | 4 |
| | | C$_3$H$_7$—[H]—[phenyl]—OOC—[H]—C$_5$H$_{11}$ | 10 | — | 6 | 6 | 5 | 6 | 8 | 8 |
| | | Total | (20) | (0) | (12) | (12) | (10) | (12) | (12) | (12) |
| | IX | C$_4$H$_9$—[H]—[H]($\frac{CN}{C_7H_{15}}$) | — | 6 | 4 | — | — | — | — | — |
| Third Liquid Crystal Material | IX | C$_5$H$_{11}$—[H]—[H]($\frac{CN}{C_5H_{11}}$) | — | 8 | 4 | 4 | 3 | 5 | 4 | 5 |
| | | Total | (0) | (14) | (8) | (4) | (3) | (5) | (4) | (5) |

TABLE 11-continued

| Liquid Crystal Material | General Formula | Example No. | Composition (% by weight) | | | | | | | |
|---|---|---|---|---|---|---|---|---|---|---|
| | | | 10 | 11 | 12 | 13 | 14 | 15 | 16 | 17 |
| | XIV | $C_3H_7$–(H)–⌬–COO–⌬($CN$)($CN$)–$C_2H_5$ | 5 | — | — | — | — | — | — | — |
| | | $C_4H_9$–(H)–⌬–COO–⌬($CN$)($CN$)–$C_4H_9$ | 5 | — | — | — | — | — | — | — |
| | | Total | (10) | (0) | (0) | (0) | (0) | (0) | (0) | (0) |

TABLE 12

| Liquid Crystal Material | General Formula | Example No. | Composition (% by weight) | | | | | | | |
|---|---|---|---|---|---|---|---|---|---|---|
| | | | 18 | 19 | 20 | 21 | 22 | 23 | 24 | 25 |
| First Liquid Crystal Material | (I) | $C_6H_{13}$–(pyrazine)–⌬–$OC_6H_{13}$ | — | — | 8 | 8 | 8 | 8 | 8 | 4 |
| | | $C_6H_{13}$–(pyrazine)–⌬–$OC_7H_{15}$ | — | — | — | — | — | — | — | 4 |
| | | $C_6H_{13}$–(pyrazine)–⌬–$OC_9H_{19}$ | — | — | — | — | — | — | — | 4 |
| | | $C_6H_{13}$–(pyrazine)–⌬–$OC_{11}H_{23}$ | — | — | 6 | 6 | 6 | 6 | 6 | 4 |
| | | $C_7H_{15}$–(pyrazine)–⌬–$OC_7H_{15}$ | — | — | 8 | 8 | 6 | 6 | 6 | 4 |
| | | $C_7H_{15}$–(pyrazine)–⌬–$OC_9H_{19}$ | — | — | 6 | 6 | 6 | 6 | 6 | 4 |
| | | $C_9H_{19}$–(pyrazine)–⌬–$OC_6H_{13}$ | — | — | 8 | 8 | 8 | 6 | 6 | 4 |
| First Liquid Crystal Material | (I) | $C_9H_{19}$–(pyrazine)–⌬–$OC_9H_{19}$ | — | — | — | — | — | — | — | 4 |
| | | Mix - 11 | — | — | 4 | — | — | — | — | — |
| | | Mix - 12 | — | — | 6 | 9 | 12 | 12 | 12 | 12 |

TABLE 12-continued

| Liquid Crystal Material | General Formula | Example No. | 18 | 19 | 20 | 21 | 22 | 23 | 24 | 25 |
|---|---|---|---|---|---|---|---|---|---|---|
| Second Liquid Crystal Material | (II) | Mix - 14<br>Total<br>Mix - 21 | 30<br>(30)<br>1 | 48<br>(48)<br>1 | —<br>(46)<br>2 | —<br>(45)<br>2 | —<br>(46)<br>2 | —<br>(44)<br>2 | —<br>(44)<br>2 | —<br>(44)<br>2 |
| Third Liquid Crystal Material | (VI) | $C_3H_7$—H—COO—◯—$OC_2H_5$ | — | — | 4 | — | — | — | — | — |
| Third Liquid Crystal Material | VI | $C_4H_9$—H—COO—◯—$OC_2H_5$ | — | — | 2 | — | — | — | — | — |
| | | $C_5H_{11}$—H—COO—◯—$OC_5H_{11}$ | — | — | — | 6 | 10 | 10 | 10 | 10 |
| | | Mix - 31<br>Total | 45<br>(45) | 30<br>(30) | —<br>(6) | —<br>(6) | —<br>(10) | —<br>(10) | —<br>(10) | —<br>(10) |
| | VII | $C_3H_7$—H—◯—$OCH_3$ | — | — | 10 | 8 | 6 | 6 | 6 | 8 |
| | | $C_3H_7$—H—◯—$OC_2H_5$ | 19 | 15 | 12 | 10 | 8 | 10 | 14 | 14 |
| | | $C_3H_7$—H—◯—$OC_4H_9$ | — | — | — | 4 | 4 | 4 | — | — |
| Third Liquid Crystal Material | VII | $C_5H_{11}$—H—◯—$C_3H_7$ | — | — | 4 | 5 | 4 | 4 | 4 | — |
| | | Total | (19) | (15) | (26) | (27) | (22) | (24) | (24) | (22) |
| | | $C_3H_7$—H—H—◯—$CH_3$ | 5 | 6 | 12 | 12 | 12 | 12 | 12 | 14 |
| | X | $C_3H_7$—H—H—◯—$C_3H_7$ | — | — | 8 | 8 | 8 | 8 | 8 | 8 |
| | | Total | (5) | (6) | (20) | (20) | (20) | (20) | (20) | (22) |

TABLE 13

| Liquid Crystal Material | General Formula | Example No. | 26 | 27 | 28 | 29 | 30 |
|---|---|---|---|---|---|---|---|
| First Liquid Crystal | (I) | Mix-13<br>Mix-14 | 26.6<br>— | 22.5<br>— | 28.2<br>— | 25.7<br>— | —<br>25.7 |

TABLE 13-continued

| Liquid Crystal Material | General Formula | Example No. | Composition (% by weight) | | | | |
|---|---|---|---|---|---|---|---|
| | | | 26 | 27 | 28 | 29 | 30 |
| Material Second Liquid Crystal Material | (II) | Mix-21 | 6.6 | 9.2 | 6.6 | 9.2 | 9.2 |
| Third Liquid Crystal Material | (VI) | Mix-31 | 39.8 | 33.8 | 42.3 | 38.6 | 38.6 |
| | (VII) | $C_3H_7$—H—◯—$OC_2H_5$ | 16.6 | 14.1 | 17.7 | 16.1 | 16.1 |
| | (IX) | $C_4H_9$—H—H(CN)($C_7H_{15}$) | 5.2 | 10.2 | — | — | — |
| | | $C_5H_{11}$—H—H(CN)($C_5H_{11}$) | 5.2 | 10.2 | — | — | — |
| | (Total) | | (10.4) | (20.2) | (0) | (0) | (0) |
| | (XIV) | $C_3H_7$—H—◯—COO—◯($CN$)($CN$)—$C_2H_5$ | — | — | 2.6 | 5.2 | 5.2 |
| | | $C_4H_9$—H—◯—COO—◯($CN$)($CN$)—$C_4H_9$ | — | — | 2.6 | 5.2 | 5.2 |
| | (Total) | | (0) | (0) | (5.2) | (10.4) | (10.4) |

TABLE 14

| Liquid Crystal Material | General Formula | Example No. | Composition (% by weight) | | | | | |
|---|---|---|---|---|---|---|---|---|
| | | | 31 | 32 | 33 | 34 | 35 | 36 |
| First Liquid Crystal Material | (I) | $C_6H_{13}$—(N,N-pyr)—◯—$OC_5H_{11}$ | | | | | 10.5 | |
| | | $C_6H_{13}$—(N,N-pyr)—◯—$OC_6H_{13}$ | | | | | 10.5 | |
| | | $C_6H_{13}$—(N,N-pyr)—◯—$OC_7H_{15}$ | | | | | 10.5 | |
| | | $C_6H_{13}$—(N,N-pyr)—◯—$OC_9H_{19}$ | | | | | 10.5 | |

TABLE 14-continued

C6H13—[pyrazine]—[phenyl]—OC11H23    10.5

C7H15—[pyrazine]—[phenyl]—OC7H15

C7H15—[pyrazine]—[phenyl]—OC9H19    10.5

C9H19—[pyrazine]—[phenyl]—OC6H13    10.5

C9H19—[pyrazine]—[phenyl]—OC9H19    10.5

| | | | | | | | | |
|---|---|---|---|---|---|---|---|---|
| First Liquid Crystal Material | (I) | Mix-11<br>Mix-12<br>Mix-14<br>(Total) | | 32<br>(32) | 40<br>(40) | 40<br>(40) | 42<br>(42) | (42) | (42) |
| Second Liquid Crystal Material | (II) | Mix-21 | | 2 | 2 | 2 | 1 | 1 | 1 |

Third Liquid Crystal Material (VI)

C5H11—[H]—COO—[phenyl]—OCH3

C3H7—[H]—COO—[phenyl]—OC2H5

C4H9—[H]—COO—[phenyl]—OC2H5

C5H11—[H]—COO—[phenyl]—C5H11

| | | |
|---|---|---|---|---|---|---|
| Mix-31<br>(Total) | 37<br>(37) | 33<br>(37) | 26<br>(26) | 26<br>(26) | 26<br>(26) | 28<br>(28) |

Third Liquid Crystal Material (VII)

C3H7—[H]—[phenyl]—OC2H5    20   20   20   20   20   26

(X)

C3H7—[H]—[H]—[phenyl]—CH3    8.5   8   8   4

TABLE 14-continued

| | | | 37 | 38 | 39 | 40 | 41 | 42 |
|---|---|---|---|---|---|---|---|---|
| | (XI) | C₃H₇—⟨⟩—C≡C—⟨⟩—OCH₃ | 4.5 | 2.5 | 3.5 | 3 | 3 | 5 |
| | | C₅H₁₁—⟨⟩—C≡C—⟨⟩—OC₂H₅ | 4.5 | 2.5 | | | | |
| | | (Total) | (9) | (5) | (3.5) | (3) | (3) | (5) |

| Liquid Crystal Material | General Formula | Composition (% by weight) Example No. | 37 | 38 | 39 | 40 | 41 | 42 |
|---|---|---|---|---|---|---|---|---|
| First Liquid Crystal Material | (I) | C₆H₁₃—pyrazine—⟨⟩—OC₅H₁₁ | | | | | | |
| | | C₆H₁₃—pyrazine—⟨⟩—OC₆H₁₃ | | | | | | |
| | | C₆H₁₃—pyrazine—⟨⟩—OC₇H₁₅ | | | | | | |
| | | C₆H₁₃—pyrazine—⟨⟩—OC₉H₁₉ | | | | | | |
| | | C₆H₁₃—pyrazine—⟨⟩—OC₁₁H₂₃ | 12 | 11 | 12 | 12 | 12 | 12 |
| | | C₇H₁₅—pyrazine—⟨⟩—OC₇H₁₅ | | | | | | |
| | | C₇H₁₅—pyrazine—⟨⟩—OC₉H₁₉ | 12 | 11 | 12 | 12 | 12 | 12 |
| | | C₉H₁₉—pyrazine—⟨⟩—OC₆H₁₃ | 12 | 11 | 12 | 12 | 12 | 12 |
| | | C₉H₁₉—pyrazine—⟨⟩—OC₉H₁₉ | 12 | 11 | 12 | 12 | 12 | 12 |
| First Liquid Crystal Material | (I) | Mix-11 | | | | | | 6 |
| | | Mix-12 | | | | | | |
| | | Mix-14 | | | | | | |
| | | (Total) | (48) | (44) | (48) | (48) | (48) | (54) |
| Second Liquid Crystal Material | (II) | Mix-21 | 2 | 2 | 2 | 1 | 3 | 0.5 |

TABLE 14-continued

| | | | | | | | | |
|---|---|---|---|---|---|---|---|---|
| Third Liquid Crystal Material | (VI) | C5H11—[H]—COO—[◯]—OCH3 <br> C3H7—[H]—COO—[◯]—OC2H5 <br> C4H9—[H]—COO—[◯]—OC2H5 <br> C5H11—[H]—COO—[◯]—C5H11 | | | | | | |
| | | Mix-31 <br> (Total) | 25.5 <br> (25.5) | 25 <br> (25) | 23 <br> (23) | 26 <br> (26) | 25 <br> (25) | 30 <br> (30) |
| Third Liquid Crystal Material | (VII) | C3H7—[H]—[◯]—OC2H5 | 16 | 20 | 18 | 16 | 16 | 10 |
| | (X) | C3H7—[H]—[H]—[◯]—CH3 | 4 | 4 | 4.5 | 3.5 | 4 | 5 |
| | (XI) | C3H7—[◯]—C≡C—[◯]—OCH3 <br> C5H11—[◯]—C≡C—[◯]—OC2H5 | 4.5 | 5 | 4.5 | 5.5 | 4 | 4.5 |
| | | (Total) | (4.5) | (5) | (4.5) | (5.5) | (4) | (4.5) |

| Liquid Crystal Material | General Formula | Composition (% by weight) Example No. | 43 | 44 | 45 | 46 | 47 | 48 |
|---|---|---|---|---|---|---|---|---|
| First Liquid Crystal Material | (I) | C6H13—[N◯N]—[◯]—OC5H11 <br> C6H13—[N◯N]—[◯]—OC6H13 <br> C6H13—[N◯N]—[◯]—OC7H15 <br> C6H13—[N◯N]—[◯]—OC9H19 | | | 12 | 12 | 11 | 10 | 8 |

TABLE 14-continued

| Structure | | | | | | | | |
|---|---|---|---|---|---|---|---|---|
| C$_6$H$_{13}$—[pyrazine]—[phenyl]—OC$_{11}$H$_{23}$ | | | 12 | 12 | 12 | 11 | 10 | 6 |
| C$_7$H$_{15}$—[pyrazine]—[phenyl]—OC$_7$H$_{15}$ | | | | 12 | 12 | 11 | 10 | 6 |
| C$_7$H$_{15}$—[pyrazine]—[phenyl]—OC$_9$H$_{19}$ | | | 10 | | | | | 4 |
| C$_9$H$_{19}$—[pyrazine]—[phenyl]—OC$_6$H$_{13}$ | | | 10 | 12 | 12 | 11 | 10 | 8 |
| C$_9$H$_{19}$—[pyrazine]—[phenyl]—OC$_9$H$_{19}$ | | | 12 | | | | | 4 |
| First Liquid Crystal Material | (I) | Mix-11 Mix-12 Mix-14 (Total) | 6 (50) | (48) | (48) | (44) | 10 (40) | (46) |
| Second Liquid Crystal Material | (II) | Mix-21 | 1.5 | 2 | 2 | 2 | 2 | 2 |
| Third Liquid Crystal Material | (VI) | C$_5$H$_{11}$—[H]—COO—[phenyl]—OCH$_3$ | | | 4 | 5 | 5 | 3 |
| | | C$_3$H$_7$—[H]—COO—[phenyl]—OC$_2$H$_5$ | | | 14 | 15 | 15 | 8 |
| | | C$_4$H$_9$—[H]—COO—[phenyl]—OC$_2$H$_5$ | | | 8 | 8 | 8 | 5 |
| | | C$_5$H$_{11}$—[H]—COO—[phenyl]—C$_5$H$_{11}$ | | | | | | |
| | | Mix-31 (Total) | 29 (29) | 26 (26) | (26) | (28) | (28) | (16) |
| Third Liquid Crystal Material | (VII) | C$_3$H$_7$—[H]—[phenyl]—OC$_2$H$_5$ | 10 | 16 | 16 | 18 | 22 | 18 |
| | (X) | C$_3$H$_7$—[H]—[H]—[phenyl]—CH$_3$ | 5 | 4 | 4 | 4 | 4 | 16 |

TABLE 14-continued

| | | | | | | | | |
|---|---|---|---|---|---|---|---|---|
| (XI) | C₃H₇—⌬—C≡C—⌬—OCH₃ | | 4.5 | 4 | 4 | 4 | 4 | 2 |
| | C₅H₁₁—⌬—C≡C—⌬—OC₂H₅ | | | | | | | |
| | (Total) | | (4.5) | (4) | (4) | (4) | (4) | (2) |

| Liquid Crystal Material | General Formula | Example No. | Composition (% by weight) |||
|---|---|---|---|---|---|
| | | | 49 | 50 | 51 |
| First Liquid Crystal Material | (I) | C₆H₁₃—[pyrazine]—⌬—OC₅H₁₁ | | | |
| | | C₆H₁₃—[pyrazine]—⌬—OC₆H₁₃ | 8 | 8 | |
| | | C₆H₁₃—[pyrazine]—⌬—OC₇H₁₅ | | | |
| | | C₆H₁₃—[pyrazine]—⌬—OC₉H₁₉ | | | |
| | | C₆H₁₃—[pyrazine]—⌬—OC₁₁H₂₃ | 6 | 6 | |
| | | C₇H₁₅—[pyrazine]—⌬—OC₇H₁₅ | 6 | 6 | 8 |
| | | C₇H₁₅—[pyrazine]—⌬—OC₉H₁₉ | 4 | 4 | 8 |
| | | C₉H₁₉—[pyrazine]—⌬—OC₆H₁₃ | 8 | 8 | 8 |
| | | C₉H₁₉—[pyrazine]—⌬—OC₉H₁₉ | 4 | 4 | 8 |
| First Liquid Crystal Material | (I) | Mix-11 | 10 | 8 | |
| | | Mix-12 | | | 6 |
| | | Mix-14 | | | |
| | | (Total) | (46) | (44) | (38) |
| Second Liquid Crystal Material | (II) | Mix-21 | 2 | 2 | 1 |

TABLE 14-continued

| Material | Formula | Structure | | | |
|---|---|---|---|---|---|
| Third Liquid Crystal Material | (VI) | $C_5H_{11}$–[H]–COO–〇–$OCH_3$ | 4 | 4 | |
| | | $C_3H_7$–[H]–COO–〇–$OC_2H_5$ | 10 | 12 | |
| | | $C_4H_9$–[H]–COO–〇–$OC_2H_5$ | 6 | 7 | |
| | | $C_5H_{11}$–[H]–COO–〇–$C_5H_{11}$ | | | 38 |
| | Mix-31 (Total) | | (20) | (23) | (38) |
| Third Liquid Crystal Material | (VII) | $C_3H_7$–[H]–〇–$OC_2H_5$ | 15 | 16 | 10 |
| | (X) | $C_3H_7$–[H]–[H]–〇–$CH_3$ | 15 | 12 | 10 |
| | (XI) | $C_3H_7$–〇–C≡C–〇–$OCH_3$ | 2 | 3 | 3 |
| | | $C_5H_{11}$–〇–C≡C–〇–$OC_2H_5$ | | | |
| | (Total) | | (2) | (3) | (3) |

TABLE 15

| Liquid Crystal Material | General Formula | Example No. | Composition (% by weight) | | | | |
|---|---|---|---|---|---|---|---|
| | | | 52 | 53 | 54 | 55 | 56 |
| First Liquid Crystal Material | (I) | $C_6H_{13}$–[N〇N]–〇–$OC_{11}H_{23}$ | | | | | |
| | | $C_7H_{15}$–[N〇N]–〇–$OC_9H_{19}$ | | | | | |
| | | $C_9H_{19}$–[N〇N]–〇–$OC_6H_{13}$ | | | | | |

TABLE 15-continued
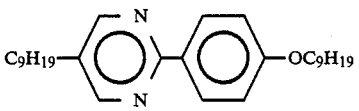
|  |  |  | | | | | |
|---|---|---|---|---|---|---|---|
| | | Mix-14 | 28.8 | 28.8 | 25.6 | 28.8 | 29 |
| | | (Total) | (28.8) | (28.8) | (25.6) | (28.8) | (29) |
| Second Liquid Crystal Material | (II) | Mix-21 | 5 | 3 | 5 | 3 | 2.5 |
| Third Liquid Crystal Material | (VI) | Mix-31 | 36 | 32.4 | 25.6 | 26 | 25.5 |
| | (VII) | 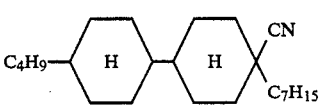 | 18 | 18 | 16 | 18 | 18 |
| Third Liquid Crystal Material | (IX) | 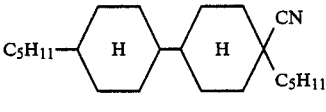 | | 3 | 7 | 3 | 3 |
| | | 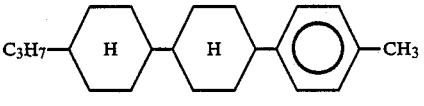 | | 4 | 8 | 4 | 4.5 |
| | | (Total) | (0) | (7) | (15) | (7) | (7.5) |
| | (X) | 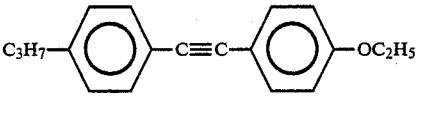 | | | | 8 | 8 |
| | (XI) | 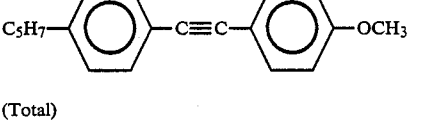 | 3.6 | 5.4 | 6.4 | 5 | 5.5 |
| | | 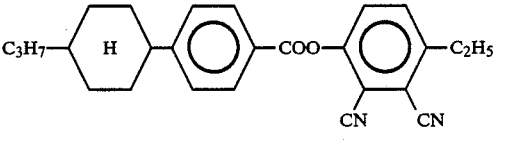 | 3.6 | 5.4 | 6.4 | 4.2 | 4 |
| | | (Total) | (7.2) | (10.8) | (12.8) | (9.2) | (9.5) |
| | (XIV) | 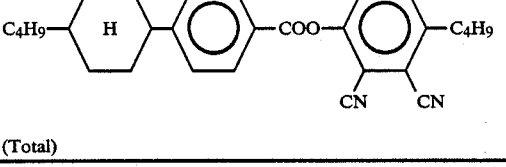 | | | | | |
| | | 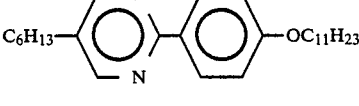 | | | | | |
| | | (Total) | (0) | (0) | (0) | (0) | (0) |
| Liquid Crystal Material | General Formula | Example No. | Composition (% by weight) | | | | |
|---|---|---|---|---|---|---|---|
| | | | 57 | 58 | 59 | 60 | 61 |
| First Liquid Crystal Material | (I) | C$_6$H$_{13}$—[pyrazine]—⌬—OC$_{11}$H$_{23}$ | 12 | 12 | 12 | | |

TABLE 15-continued

| | | | | | | | |
|---|---|---|---|---|---|---|---|
| | | C7H15—[pyridine]—[phenyl]—OC9H19 | | 12 | 12 | 12 | |
| | | C9H19—[pyridine]—[phenyl]—OC6H13 | | 12 | 12 | 12 | |
| | | C9H19—[pyridine]—[phenyl]—OC9H19 | | 12 | 12 | 12 | |
| | | Mix-14 | | | | | 28.8 | 29 |
| | | (Total) | | (48) | (48) | (48) | (28.8) | (29) |
| Second Liquid Crystal Material | (II) | Mix-21 | | 3.5 | 3 | 2.5 | 4.5 | 3.5 |
| Third Liquid Crystal Material | (VI) (VII) | Mix-31 C3H7—[H]—[phenyl]—OC2H5 | | 13 16 | 13 16. | 13 16 | 33.2 18 | 33.5 18 |
| Third Liquid Crystal Material | (IX) | C4H9—[H]—[H](CN)(C7H15) | | 4 | 4 | 4 | | |
| | | C5H11—[H]—[H](CN)(C5H11) | | | 6 | 6 | 6 | |
| | | (Total) | | (10) | (10) | (10) | (0) | (0) |
| | (X) | C3H7—[H]—[H]—[phenyl]—CH3 | | 2.5 | 2.5 | 2.5 | 5 | 5 |
| | (XI) | C3H7—[phenyl]—C≡C—[phenyl]—OC2H5 | | 7 | 7.5 | 8 | 3 | 3.5 |
| | | C5H7—[phenyl]—C≡C—[phenyl]—OCH3 | | — | — | — | 2 | 2 |
| | | (Total) | | (7) | (7.5) | (8) | (5) | (5.5) |
| | (XIV) | C3H7—[H]—[phenyl]—COO—[phenyl(CN)(CN)]—C2H5 | | | | | 3 | 3 |
| | | C4H9—[H]—[phenyl]—COO—[phenyl(CN)(CN)]—C4H9 | | | | | 2.5 | 2.5 |

TABLE 15-continued

| | | | | | | |
|---|---|---|---|---|---|---|
| (Total) | | | (0) | (0) | (0) | (5.5) | (5.5) |

TABLE 16

| Liquid Crystal Material | General Formula | Composition (% by weight) Example No. | 62 | 63 | 64 | 65 | 66 |
|---|---|---|---|---|---|---|---|
| First Liquid Crystal Material | (I) | $C_6H_{13}$—[N⌬N]—[⌬]—$OC_6H_{13}$ | 8 | 8 | — | — | — |
| | | $C_6H_{13}$—[N⌬N]—[⌬]—$OC_{11}H_{23}$ | 6 | 8 | 12 | — | — |
| | | $C_7H_{15}$—[N⌬N]—[⌬]—$OC_7H_{15}$ | — | 8 | — | — | — |
| | | $C_7H_{15}$—[N⌬N]—[⌬]—$OC_9H_{19}$ | — | 4 | 10 | — | — |
| | | $C_9H_{19}$—[N⌬N]—[⌬]—$OC_6H_{13}$ | — | 8 | 10 | — | — |
| | | $C_9H_{19}$—[N⌬N]—[⌬]—$OC_9H_{19}$ | 6 | 4 | 12 | — | — |
| | | Mix - 11 | 10 | 8 | 10 | 13.1 | 13.0 |
| First Liquid Crystal Material | (I) | Mix - 13 | — | — | — | 46.8 | 44.1 |
| | | Total | (30) | (48) | (54) | (59.9) | (57.1) |
| Second Liquid Crystal Material | (II) | Mix - 21 | 5 | 2 | 1 | 7 | 7 |
| Third Liquid Crystal Material | (VI) | $C_3H_7$—[H]—COO—[⌬]—$OC_2H_5$ | 20 | 10 | — | — | — |
| | | $C_4H_9$—[H]—COO—[⌬]—$OC_2H_5$ | 14 | 5 | — | — | — |
| | | $C_5H_{11}$—[H]—COO—[⌬]—$OCH_3$ | 6 | — | — | — | — |
| Third Liquid | VI | Mix - 31 | — | — | 34 | — | — |
| | | Total | (40) | (15) | (34) | (0) | (0) |

TABLE 16-continued

| Liquid Crystal Material | General Formula | Example No. | Composition (% by weight) | | | | |
|---|---|---|---|---|---|---|---|
| | | | 62 | 63 | 64 | 65 | 66 |
| Crystal Material | VII |  C$_3$H$_7$—H—◯—OC$_2$H$_5$ | 8 | 0 | 0 | 0 | 0 |
| | VIII | 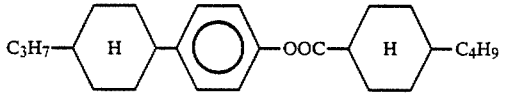 C$_3$H$_7$—H—◯—OOC—H—C$_4$H$_9$ | 4 | — | — | 7 | 5.9 |
| | | 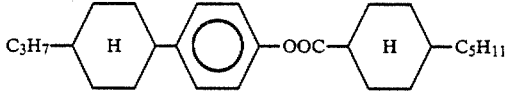 C$_3$H$_7$—H—◯—OOC—H—C$_5$H$_{11}$ | 8 | — | — | 8.7 | 8 |
| | | Total | (20) | (0) | (0) | (15.7) | (13.9) |
| | IX | 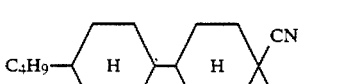 C$_4$H$_9$—H—H(CN)(C$_7$H$_{15}$) | — | — | — | 8.7 | 11 |
| Third Liquid Crystal Material | IX | 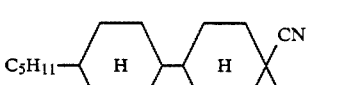 C$_5$H$_{11}$—H—H(CN)(C$_5$H$_{11}$) | 5 | — | — | 8.7 | 11 |
| | | Total | (5) | (0) | (0) | (17.4) | (22) |
| | X | 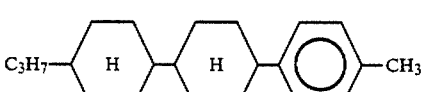 C$_3$H$_7$—H—H—◯—CH$_3$ | 0 | 13 | 7 | 0 | 0 |
| | XI | 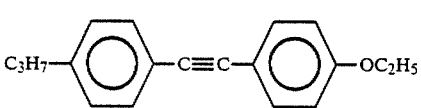 C$_3$H$_7$—◯—C≡C—◯—OC$_2$H$_5$ | 0 | 5 | 4 | 0 | 0 |
| | XV | 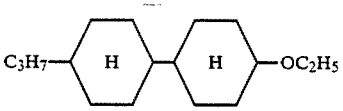 C$_3$H$_7$—H—H—OC$_2$H$_5$ | 0 | 17 | 0 | 0 | 0 |

Examples in which a phenylcyclohexane liquid crystal compound having a cyano group at its terminal end is used as the second liquid crystal material are listed in Table 17. In Examples 67 to 71, a liquid crystal compound represented by formula (III) is used as the second liquid crystal material, and liquid crystal compounds represented by formulas (VI), (VII), and (VIII) are mixed as the third liquid crystal material at different mixing ratios. Since the liquid crystal compound represented by formula (III) used as the second liquid crystal material has lower viscosity than those of the liquid crystal compounds represented by formulas (II) and (IV), the viscosities of the liquid crystal compositions can be reduced.

Examples using a dioxane liquid crystal compound having a cyano group at its terminal end as the second liquid crystal material are listed in Table 18. In Examples 72 to 74, a liquid crystal compound represented by formula (IV) is used as the second liquid crystal material, and liquid crystal compounds represented by formulas (VI), (VII), (VIII), (X), (XII), and (XIV) are selectively mixed as the third liquid crystal material. The liquid crystal compound represented by formula (IV) used as the second liquid crystal material has a larger Δε value than those of the other liquid crystal compounds used as the second liquid crystal material.

Examples using a biphenyl liquid crystal compound having a cyano group at its terminal end as the second liquid crystal material are listed in Table 19. In Examples 75 to 77, a liquid crystal compound represented by formulas (V) is used as the first liquid crystal material, and liquid crystal compounds represented by formulas (VI), (VII), (XII), and (XIII) are mixed as the third liquid crystal material at different mixing ratios.

As the second liquid crystal material, a plurality of liquid crystal compounds having different chemical structures may be used. Example 78 using liquid crystal compounds represented by formulas (II) and (V) as the second liquid crystal material is shown in Table 20. In this case, it is preferable to mix liquid crystal compounds represented by formulas (VI), (VII), (X), and (XI) as the third liquid crystal material.

TABLE 17

| Liquid Crystal Material | General Formula | Example No. / Composition (% by weight) | 67 | 68 | 69 | 70 | 71 |
|---|---|---|---|---|---|---|---|
| First Liquid Crystal Material | (I) | 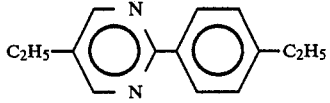 C$_2$H$_5$—pyridine—phenyl—C$_2$H$_5$ | 8 | 8 | — | — | — |
| | | 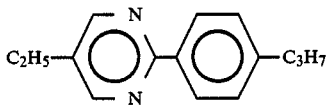 C$_2$H$_5$—pyridine—phenyl—C$_3$H$_7$ | 9 | 8 | — | — | — |
| | | 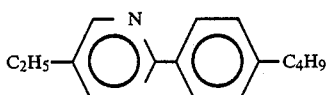 C$_2$H$_5$—pyridine—phenyl—C$_4$H$_9$ | 8 | 9 | — | — | — |
| | | 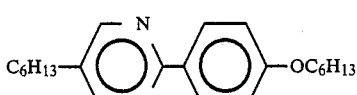 C$_6$H$_{13}$—pyridine—phenyl—OC$_6$H$_{13}$ | — | — | 8 | 10 | — |
| | | 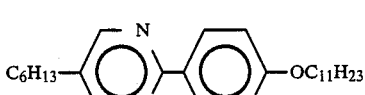 C$_6$H$_{13}$—pyridine—phenyl—OC$_{11}$H$_{23}$ | — | — | 6 | 6 | — |
| | | 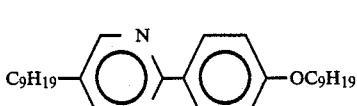 C$_9$H$_{19}$—pyridine—phenyl—OC$_9$H$_{19}$ | — | — | 6 | 6 | — |
| First Liquid Crystal Material | I | Mix - 11 | — | — | 10 | 10 | 20 |
| | | Total | (25) | (25) | (30) | (32) | (20) |
| Second Liquid Crystal Material | III | 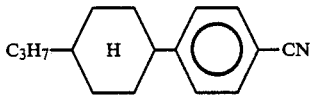 C$_3$H$_7$—H—phenyl—CN | 3 | 5 | 7 | 4 | 5 |
| Third Liquid Crystal Material | VI | 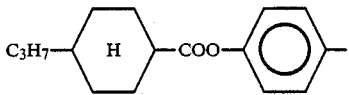 C$_3$H$_7$—H—COO—phenyl—OC$_2$H$_5$ | 24 | 24 | 20 | 22 | 22 |
| | | 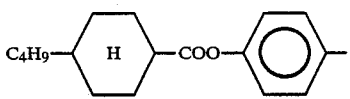 C$_4$H$_9$—H—COO—phenyl—OC$_2$H$_5$ | 18 | 18 | 16 | 15 | 18 |
| | | 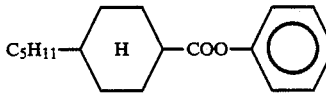 C$_5$H$_{11}$—H—COO—phenyl—OCH$_3$ | 10 | 10 | 6 | 6 | 10 |
| | | Total | (52) | (52) | (42) | (43) | (50) |
| Third Liquid Crystal Material | VII | 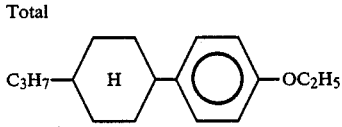 C$_3$H$_7$—H—phenyl—OC$_2$H$_5$ | 0 | 0 | 8 | 8 | 8 |

TABLE 17-continued

| Liquid Crystal Material | General Formula | Composition (% by weight) Example No. | 67 | 68 | 69 | 70 | 71 |
|---|---|---|---|---|---|---|---|
| | VIII | $C_3H_7$—H—⬡—OOC—H—$C_4H_9$ | 6 | 6 | 5 | 5 | 7 |
| | | $C_3H_7$—H—⬡—OOC—H—$C_5H_{11}$ | 12 | 12 | 8 | 8 | 10 |
| | | Total | (18) | (18) | (21) | (21) | (25) |

TABLE 18

| Liquid Crystal Material | General Formula | Composition (% by weight) Example No. | 72 | 73 | 74 |
|---|---|---|---|---|---|
| First Liquid Crystal Material | (I) | $C_6H_{13}$—⬡(N,N)—⬡—$OC_6H_{13}$ | — | 4 | — |
| | | $C_6H_{13}$—⬡(N,N)—⬡—$OC_7H_{15}$ | — | 4 | — |
| | | $C_6H_{13}$—⬡(N,N)—⬡—$OC_9H_{19}$ | — | 4 | 5 |
| | | $C_6H_{13}$—⬡(N,N)—⬡—$OC_{11}H_{23}$ | — | 4 | 6 |
| | | $C_7H_{15}$—⬡(N,N)—⬡—$OC_7H_{15}$ | — | 4 | 5 |
| | | $C_7H_{15}$—⬡(N,N)—⬡—$OC_9H_{19}$ | — | 4 | 5 |
| | | $C_9H_{19}$—⬡(N,N)—⬡—$OC_6H_{13}$ | — | 4 | 5 |
| First Liquid Crystal Material | I | $C_9H_{19}$—⬡(N,N)—⬡—$OC_9H_{19}$ | — | 4 | 6 |
| | | Mix - 12 | — | 12 | 12 |
| | | Mix - 13 | 41.1 | — | — |
| | | Total | (41.1) | (44) | (44) |

TABLE 18-continued

| Liquid Crystal Material | General Formula | Composition (% by weight) Example No. | 72 | 73 | 74 |
|---|---|---|---|---|---|
| Second Liquid Crystal Material | IV | C₅H₁₁—⟨O⟩—⟨○⟩—CN | — | 2 | 2 |
| | | Mix - 22 | 7 | — | — |
| | | Total | (7) | (2) | (2) |
| Third Liquid Crystal Material | VI | C₅H₁₁—⟨H⟩—COO—⟨○⟩—C₅H₁₁ | 0 | 10 | 12 |
| | VII | C₃H₇—⟨H⟩—⟨○⟩—OCH₃ | — | 8 | — |
| | | C₃H₇—⟨H⟩—⟨○⟩—OC₂H₅ | — | 14 | 22 |
| | | C₃H₇—⟨H⟩—⟨○⟩—C₂H₅ | 20 | — | — |
| | | Total | (20) | (22) | (22) |
| | VIII | C₃H₇—⟨H⟩—⟨○⟩—OOC—⟨H⟩—C₄H₉ | 8.9 | — | — |
| | | C₃H₇—⟨H⟩—⟨○⟩—OOC—⟨H⟩—C₅H₁₁ | 10 | — | — |
| Third Liquid Crystal Material | VIII | Total | (18.9) | (0) | (0) |
| | X | C₃H₇—⟨H⟩—⟨H⟩—⟨○⟩—CH₃ | — | 14 | 18 |
| | | C₃H₇—⟨H⟩—⟨H⟩—⟨○⟩—C₃H₇ | — | 8 | — |
| | | Total | (0) | (22) | (18) |
| | XII | C₅H₁₁—⟨H⟩—⟨○⟩—⟨○⟩—C₂H₅ | 0 | 0 | 2 |
| | XIV | C₃H₇—⟨H⟩—⟨○⟩—COO—⟨○⟩(CN)(CN)—C₂H₅ | 5 | — | — |

TABLE 18-continued

| Liquid Crystal Material | General Formula | Composition (% by weight) | | | |
|---|---|---|---|---|---|
| | | Example No. | 72 | 73 | 74 |
| Third Liquid Crystal Material | XIV | $C_4H_9$—〈H〉—〈◯〉—COO—〈◯〉(CN)(CN)—$C_4H_9$ | 5 | — | — |
| | | Total | (10) | (0) | (0) |

TABLE 19

| Liquid Crystal Material | General Formula | Composition (% by weight) | | | |
|---|---|---|---|---|---|
| | | Example No. | 75 | 76 | 77 |
| First Liquid Crystal Material | (I) | $C_6H_{13}$—〈N,N〉—〈◯〉—$OC_7H_{15}$ | 9 | 9 | — |
| | | $C_6H_{13}$—〈N,N〉—〈◯〉—$OC_9H_{19}$ | 9 | 9 | 9 |
| | | $C_6H_{13}$—〈N,N〉—〈◯〉—$OC_{11}H_{23}$ | — | — | 9 |
| | | $C_7H_{15}$—〈N,N〉—〈◯〉—$OC_7H_{15}$ | 9 | 9 | — |
| | | $C_7H_{15}$—〈N,N〉—〈◯〉—$OC_9H_{19}$ | 9 | 9 | 9 |
| | | $C_9H_{19}$—〈N,N〉—〈◯〉—$OC_9H_{19}$ | — | — | 9 |
| | | Total | (36) | (36) | (36) |
| Second Liquid Crystal Material | V | $C_2H_5$—〈◯〉—〈◯〉—CN | 1 | 1 | 1 |
| Third Liquid Crystal Material | VI | $C_5H_{11}$—〈H〉—COO—〈◯〉—$C_5H_{11}$ | 15 | 15 | 15 |
| | VII | $C_5H_{11}$—〈H〉—〈◯〉—$C_3H_7$ | 12 | 12 | 12 |

TABLE 19-continued

| Liquid Crystal Material | General Formula | Composition (% by weight) Example No. | 75 | 76 | 77 |
|---|---|---|---|---|---|
| | | $C_3H_7$—(H)—⟨⟩—$OC_4H_9$ | 12 | 12 | 12 |
| | | Total | (24) | (24) | (24) |
| | XII | $C_5H_{11}$—(H)—⟨⟩—⟨⟩—$C_2H_5$ | 8 | 8 | 11 |
| | XIII | $C_3H_7$—(H)—(H)—COO—⟨⟩—$C_3H_7$ | 4 | 4 | 3 |

TABLE 20

| Liquid Crystal Material | General Formula | Composition (% by weight) Example No. | 78 |
|---|---|---|---|
| First Liquid Crystal Material | I | $C_6H_{13}$—(N,N-pyridine)—⟨⟩—$OC_6H_{13}$ | 8 |
| | | $C_6H_{13}$—(N,N-pyridine)—⟨⟩—$OC_{11}H_{23}$ | 8 |
| | | $C_7H_{15}$—(N,N-pyridine)—⟨⟩—$OC_7H_{15}$ | 8 |
| | | $C_7H_{15}$—(N,N-pyridine)—⟨⟩—$OC_9H_{19}$ | 4 |
| | | $C_9H_{19}$—(N,N-pyridine)—⟨⟩—$OC_6H_{13}$ | 8 |
| | | $C_9H_{19}$—(N,N-pyridine)—⟨⟩—$OC_9H_{19}$ | 4 |
| | | Mix - 11 | 4 |
| | | Total | (44) |
| Second Liquid Crystal Material | II | Mix - 21 | 2 |
| | V | $C_2H_5$—⟨⟩—⟨⟩—CN | 2 |
| | | Total | (4) |

TABLE 20-continued

| Liquid Crystal Material | General Formula | Composition (% by weight) | |
|---|---|---|---|
| | | Example No. | 78 |
| Third Liquid Crystal Material | VI | 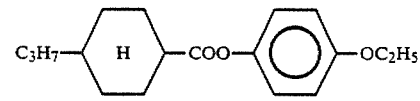 | 8 |
| | | 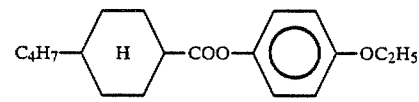 | 5 |
| | | 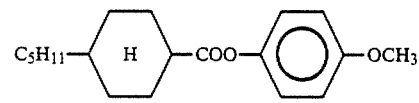 | 4 |
| | | Total | (17) |
| | VII |  | 20 |
| | X | 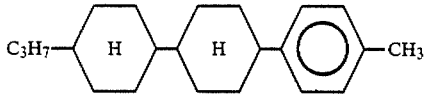 | 14 |
| | XI | 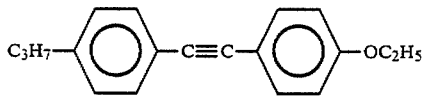 | 1 |

In Examples 1 to 78 described above, a relatively large amount of a pyrimidine liquid crystal compound represented by formula (I) having a small elastic constant ratio $K_{33}/K_{11}$ value is mixed. Therefore, elastic constant ratios of the liquid crystal compositions of these examples are less than 1.0. In addition, in these examples, a relatively large amount of a liquid crystal compound represented by formula (I) in which the dielectric anisotropy $\Delta\epsilon$ is positively small is mixed or a mixing ratio of the second liquid crystal material in which the dielectric anisotropy is positively large is very small, and the liquid crystal compounds in which dielectric anisotropy $\Delta\epsilon$ is negative or almost 0 are mixed in the third liquid crystal material. Therefore, $\Delta\epsilon/\epsilon\perp$ values of the liquid crystal compositions of the above examples are 0.5 or less.

Of the above examples, physical characteristics of the main compositions are summarized in Table 21 below.

TABLE 21

| Example No. | | 9 | 10 | 11 | 13 | 17 | 18 | 20 |
|---|---|---|---|---|---|---|---|---|
| Properties of Liquid Crystal Composition | C.P. (°C.) | — | 60 | 53 | 55 | 60 | 56 | 57 |
| | $\Delta n$ | 0.132 | 0.143 | — | 0.101 | 0.110 | 0.108 | 0.120 |
| | $\Delta\epsilon$ | 0.69 | 1.11 | 1.17 | 1.10 | 1.19 | 0.2 | 1.26 |
| | $\Delta\epsilon/\epsilon\perp$ | 0.2 or less | 0.3 or less | ← | ← | 0.2 or less | 0.1 or less | 0.3 or less |
| | Viscosity (c.p.) | 30 | 50 | 54 | 16 | 23 | 30 | 22* |
| Example No. | | 24 | 25 | 26 | 27 | 28 | 29 | 30 |
| Properties of Liquid Crystal Composition | C.P. (°C.) | — | 60 | 50 | 48 | 53 | 54 | 50 |
| | $\Delta n$ | 0.119 | 0.120 | 0.099 | 0.094 | 0.110 | 0.115 | 0.119 |
| | $\Delta\epsilon$ | 1.10 | 1.10 | 1.81 | 1.00 | 1.00 | 1.59 | 1.00 |
| | $\Delta\epsilon/\epsilon\perp$ | ← | ← | ← | ← | ← | ← | ← |
| | Viscosity (c.p.) | 24 | 24 | 30 | 36 | 34 | 44 | 47 |
| Example No. | | 33 | 36 | 41 | 42 | 47 | 49 | 51 |
| Properties of Liquid Crystal Composition | C.P. (°C.) | 56 | 56.4 | — | — | 56 | 58 | — |
| | $\Delta n$ | 0.126 | 0.126 | 0.132 | 0.131 | 0.129 | 0.129 | 0.116 |
| | $\Delta\epsilon$ | 0.93 | 0.17 | 0.80 | 0.50 | 0.1 | 0.83 | 0.39 |
| | $\Delta\epsilon/\epsilon\perp$ | 0.1 or less | ← | 0.2 or less | 0.2 or less | 0.3 or less | ← | 0.1 or less |
| | Viscosity (c.p.) | 34 | 28 | 31 | 29 | 25* | 24* | 25 |

TABLE 21-continued

| Example No. | | 52 | 53 | 54 | 55 | 56 | 59 | 60 |
|---|---|---|---|---|---|---|---|---|
| Properties | C.P. (°C.) | 51 | 48.9 | 48 | — | 56.2 | 55.3 | — |
| of Liquid | $\Delta n$ | 0.126 | 0.123 | 0.118 | 0.123 | 0.125 | 0.131 | 0.126 |
| Crystal | $\Delta \epsilon$ | 1.25 | 0.96 | 1.25 | 1.21 | 0.53 | 0.28 | 0.4 |
| Composition | $\Delta\epsilon/\epsilon\perp$ | 0.2 or less | 0.1 or less | ← | ← | — | — | 0.1 or less |
| | Viscosity (c.p.) | 38 | 32 | 36 | — | 33 | 36 | — |

| Example No. | | 62 | 63 | 64 | 65 | 66 | 67 | 68 |
|---|---|---|---|---|---|---|---|---|
| Properties | C.P. (°C.) | 58.5 | 59.6 | — | 57.7 | 55.3 | 59 | — (65) |
| of Liquid | $\Delta n$ | 0.111 | 0.128 | 0.132 | 0.125 | 0.122 | 0.106 | 0.105 |
| Crystal | $\Delta \epsilon$ | 1.77 | 0.87 | 0.42 | 1.48 | 1.70 | 1.07 | 1.27 |
| Composition | $\Delta\epsilon/\epsilon\perp$ | ← or less | ← or less | 0.4 | 0.3 or less | 0.3 or less | 0.4 or less | or less |
| | Viscosity (c.p.) | 23 | 23.4* | 30 | 44 | 45 | 14 | 14 |

| Example No. | | 69 | 70 | 71 | 72 | 74 | 76 | 77 |
|---|---|---|---|---|---|---|---|---|
| Properties | C.P. (°C.) | 61.1 | 62 | 60 | 55 | — | — | — |
| of Liquid | $\Delta n$ | 0.109 | 0.110 | 0.103 | 0.111 | — | 0.11 | 0.113 |
| Crystal | $\Delta \epsilon$ | 1.72 | 1.10 | 1.10 | 0.64 | 1.25 | 0.11 | 0.13 |
| Composition | $\Delta\epsilon/\epsilon\perp$ | 0.2 or less | 0.2 or less | 0.3 or less | 0.4 or less | ← | 0.3 or less | 0.1 or less |
| | Viscosity (c.p.) | 20 | 20 | 17 | 49 | — | | 25 |

Figure 2:
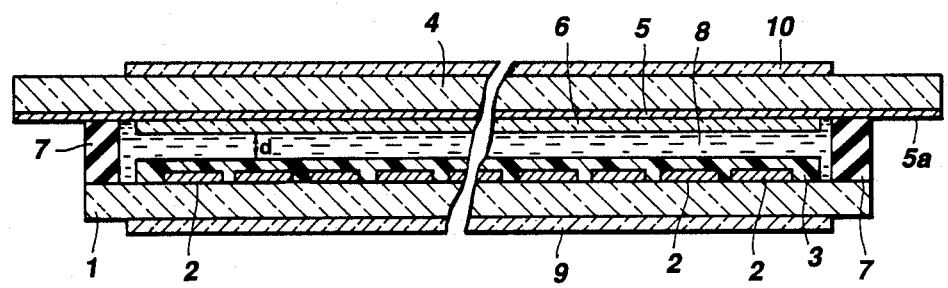
FIG. 2 is a sectional view showing a liquid crystal display device using a liquid crystal composition of the present invention.
Figure 3:
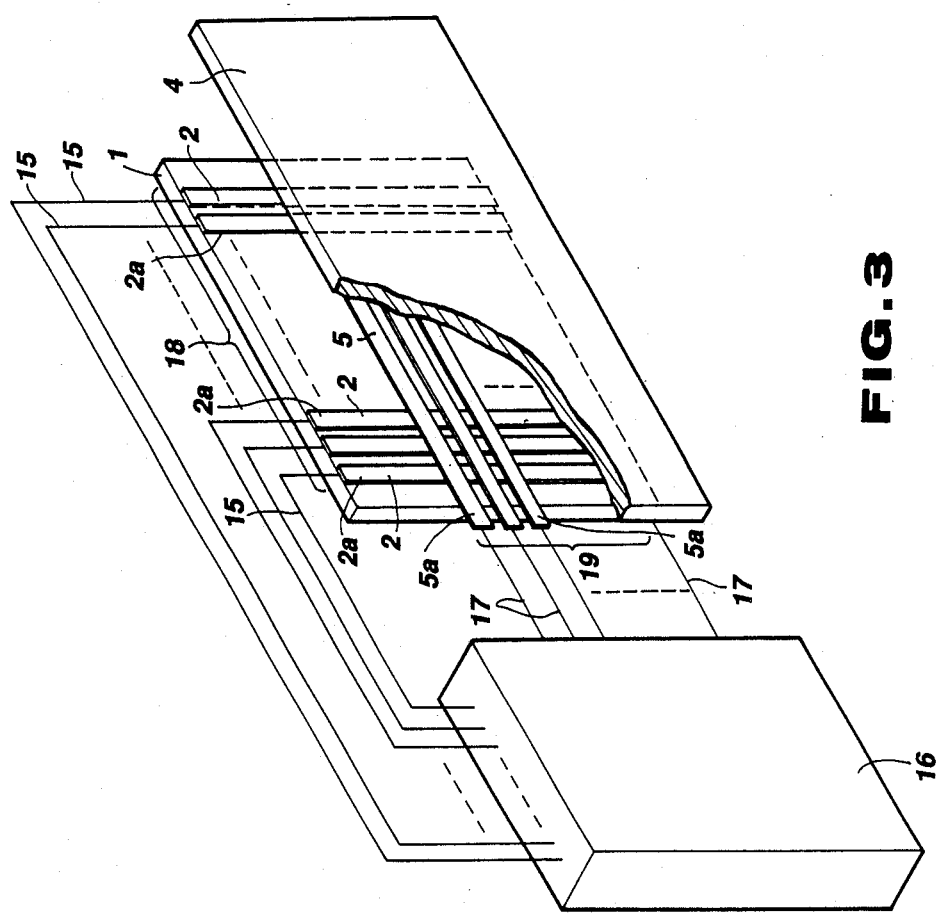
FIG. 3 is a schematic exploded perspective view showing a structure of the liquid crystal display device shown in FIG. 2.

The liquid crystal composition of the present invention is used in a multiplex drive twisted nematic liquid crystal display device as shown in FIGS. 2 and 3. This liquid crystal display device is arranged as follows.

In FIGS. 2 and 3, a plurality of first electrodes 2 which vertically extend in FIG. 3 are arranged on lower substrate 1 consisting of a transparent glass plate or an optically isotropic plastic plate. Aligning film 3 which is subjected to an aligning treatment is formed to cover the substrate surface on which electrodes 2 are arranged. A plurality of second electrodes 5 which extend in a transverse direction in FIG. 3 are arranged on upper substrate 4 consisting of a material similar to that of lower substrate 1. Aligning film 6 which is subjected to an aligning treatment is formed to cover the substrate surface on which second electrodes 5 are arranged. Lower and upper substrates 1 and 4 oppose each other with a predetermined interval therebetween such that the surfaces on which first and second electrodes 2 and 5 are formed face inward, and are adhered by sealing member 7. Nematic liquid crystal 8 to be described below is sealed between substrates 1 and 4. Nematic liquid crystal 8 forms a liquid crystal layer having thickness d between first and second electrodes 2 and 5.

A pair of polarizing plates 9 and 10 are arranged on the outer surfaces of substrates 1 and 4, respectively.

FIGS. 4A and 4B show an orienting direction of aligning films 3 and 6 and a direction of polarizing axes of polarizing plates 9 and 10. Films 3 and 6 formed on the electrode-formed surfaces of lower and upper substrates 1 and 4 are rubbed as shown in FIG. 4A. That is, film 3 on substrate 1 is rubbed in orienting direction 11 indicated by a broken arrow, and film 6 on substrate 4 is rubbed in orienting direction 12 indicated by a solid arrow which crosses direction 11 at substantially 90°. In this manner, nematic liquid crystal 8 sealed between substrates 1 and 4 rubbed in directions separated by substantially 90° is subjected to twisted alignment in which liquid crystal molecules are twisted through substantially 90°. As shown in FIG. 4A, polarizing axis 13 (indicated by the broken arrow) of lower polarizing plate 9 and polarizing axis 14 (indicated by the solid arrow) of upper polarizing plate 10 are substantially parallel to each other and to direction 12 of film 6 formed on substrate 4. Note that as shown in FIG. 4B, polarizing axes 13 and 14 of plates 9 and 10 may be substantially parallel to each other and to direction 11 of film 3 formed on substrate 1.

As shown in FIG. 3, in the above liquid crystal display device, terminals 2a of first electrodes 2 extending from an end portion of lower substrate 1 are connected to driver 16 through lead lines 15, and terminals 5a of second electrodes 5 extending from an end portion of upper substrate 4 are connected to driver 16 through lead lines 17. In the liquid crystal display device having the above arrangement, electrodes 2 formed on substrate 1 constitute column electrode 18, and electrodes 5 formed on substrate 4 constitute row electrode 19. Each portion at which column electrode 18 crosses row electrode 19 through the nematic liquid crystal forms a pixel. A scanning signal for applying a voltage sequentially to electrodes 5 is supplied from driver 16 to row electrode 19, and a data signal corresponding to image data is supplied to electrodes 2 of column electrode 18 in synchronism with the scanning signal. In this manner, an electric field is applied to the nematic liquid crystal at a portion at which row electrode 19 crosses column electrode 18 to activate liquid crystal molecules, thereby controlling an on/off state of each pixel. That is, this liquid crystal display device is driven in a multiplex manner.

The liquid crystal compositions of the present invention were used in the above liquid crystal display device, and electrooptical characteristics of the liquid crystal display device were measured. Tables 22 and 23 show the electrooptical characteristics of the liquid crystal display device using the main liquid crystal compositions of the examples of the present invention. In Table 22, optical anisotropy $\Delta n$ is a measured value obtained when $\lambda = 589$ nm, and the contrast is a maximum value of a value ($Y_{ON}/Y_{OFF}$) obtained by dividing value $Y_{ON}$ of transmittivity in an ON state when the device was driven by a drive signal of 1/64 duty by value $Y_{OFF}$ of transmittivity in an OFF state in each viewing angle direction. Threshold voltage $V_{th}$ is an applied voltage when a maximum contrast is obtained.

The response speed is defined as $(T_r+T_D)/2$ assuming that a rise time required for the luminance to reach from 10% to 90% is $T_r$ and a decay time required for the luminance to reach from 90% to 10% is $T_D$. The viewing angle characteristic is defined as $V_{th}(\theta=30°)/V_{th}(\theta=10°)$ or $V_{th}(\theta=-10°)/V_{th}(\theta=10°)$ at a temperature of 25° C. assuming that a threshold voltage observed from direction P inclined through 10° from the Z axis perpendicular to the substrate surface of liquid crystal display device A toward a viewing angle direction is $V_{th}(\theta=10°)$ and a threshold voltage observed from direction Q inclined from the Z axis toward a direction opposite to the viewing angle direction is $V_{th}(\theta=-10°)$. Note that the viewing angle characteristic is better when its value is closer to 1, i.e., the viewing angle is wider.

TABLE 22

| | | | Example No. | 11 | 13 | 18 | 20 | 24 | 25 | 26 | 27 |
|---|---|---|---|---|---|---|---|---|---|---|---|
| Properties of Liquid Crystal Device | | d (μm) | | 4.7 | 5.2 | 6.0 | 6.1 | 6.2 | 6.3 | 6.1 | 6.4 |
| | | Δnd (μm) | | — | 0.53 | 0.66 | 0.73 | 0.74 | 0.76 | 0.60 | 0.60 |
| | Con- $\theta=10°$ trast | | YON/YOFF | 21 | 12 | — | 18 | 18 | 17 | 18 | |
| | | | Vth | 25.5 | 19.4 | — | 24.6 | 24.6 | 26.3 | 18.9 | 16.8 |
| | Response Speed (msec) | | | 35.0 | 33.0 | — | 36.0 | — | 36.0 | 46.0 | 55.0 |
| | γ Property | | | — | — | — | — | — | — | — | — |

| | | | Example No. | 29 | 30 | 33 | 36 | 41 | 42 | 47 | 49 |
|---|---|---|---|---|---|---|---|---|---|---|---|
| Properties of Liquid Crystal Device | | d (μm) | | 5.2 | 5.3 | 5.6 | 5.0 | 5.0 | 4.7 | 5.1 | 5.2 |
| | | Δnd (μm) | | 0.59 | 0.63 | 0.70 | 0.62 | 0.66 | 0.62 | 0.65 | 0.67 |
| | Con- $\theta=10°$ trast | | YON/YOFF | 19 | 16 | 15 | 23 | 18 | 18 | — | 17 |
| | | | Vth | 21.2 | 19.3 | 28.0 | 38.3 | 25.9 | 38.7 | — | 25.6 |
| | Response Speed (msec) | | | 47.0 | 41.3 | (d = 5.2) 26.5 | — | — | 27.5 | — | 30.9 |
| | γ Property | | | — | — | — | — | — | — | 1.116 | — |

| | | | Example No. | 52 | 53 | 54 | 55 | 56 | 59 | 60 | 62 |
|---|---|---|---|---|---|---|---|---|---|---|---|
| Properties of Liquid Crystal Device | | d (μm) | | 5.1 | 5.2 | 5.5 | 4.7 | 5.3 | 4.7 | 4.6 | 5.0 |
| | | Δnd (μm) | | 0.65 | 0.63 | 0.65 | 0.58 | 0.66 | 0.62 | 0.58 | 0.56 |
| | Con- $\theta=10°$ trast | | YON/YOFF | 16 | 15 | 18 | 14 | 15 | 24.5 | 19 | 17 |
| | | | Vth | 24.7 | 27.7 | 24.7 | 26.9 | 32.1 | 34.7 | 30.9 | 19.3 |
| | Response Speed (msec) | | | 33.0 | 30.0 | 43.5 | 26.5 | — | 41.5 | 34.0 | 28.5 |
| | γ Property | | | — | — | — | — | — | — | — | — |

| | | | Example No. | 63 | 64 | 66 | 67 | 69 | 70 | 71 | 72 |
|---|---|---|---|---|---|---|---|---|---|---|---|
| Properties of Liquid Crystal Device | | d (μm) | | 5.5 | 4.7 | 5.5 | 5.2 | 4.7 | 4.7 | 5.0 | 5.1 |
| | | Δnd (μm) | | 0.71 | 0.62 | 0.67 | 0.55 | 0.51 | 0.52 | 0.51 | 0.56 |
| | Con- $\theta=10°$ trast | | YON/YOFF | 20 | 19 | 26 | 14 | 9 | 13 | 11 | 22 |
| | | | Vth | 28.6 | 33.2 | 20.0 | 24.6 | 19.8 | 26.2 | 22.2 | 30.5 |
| | Response Speed (msec) | | | 36.4 | 31.5 | 60.3 | — | 27.5 | 26.0 | 25.0 | 55.5 |
| | γ Property | | | — | — | — | 1.119 | — | 1.128 | — | — |

TABLE 23

| | | | | | Example No. | | | | | |
|---|---|---|---|---|---|---|---|---|---|---|
| | | | | | 11 | 13 | 18 | 26 | 27 | 29 | 30 |
| Electro-Optical Properties | Con-trast | $\theta=-10°$ | | YON/YOFF | 12 | 7 | — | 10 | 10 | 10 | 10 |
| | | | | Vth | 27.2 | 22.2 | — | 21.0 | 18.6 | 23.4 | 21.4 |
| | | $\theta=30°$ | | YON/YOFF | 26 | 7 | 21 | 15 | 11 | 13 | 16 |
| | | | | Vth | 24.4 | 19.0 | 48.4 | 17.4 | 15.5 | 19.8 | 17.7 |
| | Viewing Angle Properties | | $\dfrac{\text{Vth }(\theta=-10°)}{\text{Vth }(\theta=10°)}$ | | 1.086 | 1.144 | — | 1.111 | 1.107 | 1.104 | 1.109 |
| | | | $\dfrac{\text{Vth }(\theta=30°)}{\text{Vth }(\theta=10°)}$ | | 0.957 | 0.979 | — | 0.921 | 0.923 | 0.934 | 0.917 |

| | | | | | Example No. | | | | | |
|---|---|---|---|---|---|---|---|---|---|---|
| | | | | | 33 | 36 | 41 | 42 | 49 | 52 | 53 |
| | Con- | $\theta=-10°$ | | YON/YOFF | 7 | 11 | 9 | — | — | 8 | — |
| | | | | Vth | 31.1 | 42.3 | 28.5 | — | — | 27.4 | — |

TABLE 23-continued

|  |  |  |  |  |  |  |  |  |  |
|---|---|---|---|---|---|---|---|---|---|
| Electro-<br>Optical<br>Proper-<br>ties | trast<br>  <br>View-<br>ing<br>Angle<br>Proper-<br>ties | $\theta = 30°$ | YON/<br>YOFF<br>Vth<br>$\dfrac{Vth\ (\theta = -10°)}{Vth\ (\theta = 10°)}$<br>$\dfrac{Vth\ (\theta = 30°)}{Vth\ (\theta = 10°)}$ | 21<br>26.7<br>1.111<br><br>0.954 | 18<br>35.5<br>1.102<br><br>0.924 | 16<br>24.0<br>1.100<br><br>0.927 | 14<br>36.3<br>—<br><br>0.930 | 19<br>24.5<br><br><br>0.957 | 12<br>22.8<br>1.109<br><br>0.923 | 13<br>25.3<br>—<br><br>0.913 |

|  |  |  |  | Example No. | | | | | | |
|---|---|---|---|---|---|---|---|---|---|---|
|  |  |  |  | 54 | 55 | 59 | 60 | 63 | 64 | 66 |
| Electro-<br>Optical<br>Proper-<br>ties | Con-<br>trast<br>  <br>View-<br>ing<br>Angle<br>Proper-<br>ties | $\theta = -10°$<br><br>$\theta = 30°$ | YON/<br>YOFF<br>Vth<br>YON/<br>YOFF<br>Vth<br>$\dfrac{Vth\ (\theta = -10°)}{Vth\ (\theta = 10°)}$<br>$\dfrac{Vth\ (\theta = 30°)}{Vth\ (\theta = 10°)}$ | 8<br>27.1<br><br>26<br>23.6<br>1.097<br><br>0.955 | 8<br>30.8<br><br>12<br>26.1<br>1.15<br><br>0.970 | 10<br>37.7<br><br>27<br>33.3<br>1.086<br><br>0.960 | 8<br>33.4<br><br>23<br>29.5<br>1.081<br><br>0.955 | —<br>—<br><br>26<br>27.3<br>—<br><br>0.955 | 12<br>36.5<br><br>14<br>30.7<br>1.099<br><br>0.925 | 11<br>21.8<br><br>26<br>19.3<br>1.09<br><br>0.965 |

|  |  |  |  | Example No. | | | | |
|---|---|---|---|---|---|---|---|---|
|  |  |  |  | 67 | 69 | 70 | 71 | 72 |
| Electro-<br>Optical<br>Proper-<br>ties | Con-<br>trast<br>  <br>View-<br>ing<br>Angle<br>Proper-<br>ties | $\theta = -10°$<br><br>$\theta = 30°$ | YON/<br>YOFF<br>Vth<br>YON/<br>YOFF<br>Vth<br>$\dfrac{Vth\ (\theta = -10°)}{Vth\ (\theta = 10°)}$<br>$\dfrac{Vth\ (\theta = 30°)}{Vth\ (\theta = 10°)}$ | 7<br>27.5<br><br>8<br>24.3<br>1.118<br><br>0.988 | 7<br>22.5<br><br>6<br>19.1<br>1.136<br><br>0.965 | —<br>—<br><br>6<br>25.2<br>—<br><br>0.962 | 8<br>24.8<br><br>5<br>21.7<br>1.117<br><br>0.977 | 14<br>33.5<br><br>8<br>29.4<br>1.098<br><br>0.964 |

As is apparent from Tables 22 and 23, the contrast values obtained when the viewing angle is 10° are 11 to 26, and the response speeds are 63 msec or less. The viewing angle characteristics obtained when the viewing angle is in a −10° direction are 1.15 or less, and those obtained when the viewing angle is in a 30° direction are 0.921 or more.

In each of the above liquid crystal display devices, a product value Δn·d of liquid crystal layer thickness d and the optical anisotropy of the liquid crystal composition is set to be a value smaller than 1.1. That is, the Δn·d values of the liquid crystal display devices are 0.51 to 0.76. In this manner, the liquid crystal display devices having good contrast can be obtained with the Δn·d values different from 1.1. As in the present invention, a liquid crystal display device using a liquid crystal composition having small elastic constant ratio $K_{33}/K_{11}$ and $\Delta\epsilon/\epsilon\perp$ values provides better electrooptical characteristics when the elastic constant ratio $K_{33}/K_{11}$ value is smaller than 0.8 and the dielectric ratio $\Delta\epsilon/\epsilon\perp$ value is smaller than 0.5 as much as possible.

More specifically, in a liquid crystal composition in which ratio $\Delta\epsilon/\epsilon\perp$ of dielectric anisotropy $\Delta\epsilon$ to dielectric constant $\epsilon\perp$ in a direction perpendicular to a liquid crystal molecular axis is small, a change in dielectric constant corresponding to a change in alignment of liquid crystal molecules is small, and a change in equivalent impedance of the liquid crystals is small. Therefore, since the linearity of the electric field to be applied to the liquid crystal with respect to the voltage to be applied between the electrodes is improved, the contrast is improved. The response speed of the liquid crystal display device is represented by equations (2) and (3) described above. In this case, assuming that:

$$V_C = \sqrt{K/\epsilon_0 \Delta\epsilon} \tag{4}$$

the following equation (5) is obtained:

$$t_{ON} = \eta_1 d^2 / \pi^2 k (V^2/V_C^{22} - 1) \tag{5}$$

As is apparent from equations (5) and (3), in the liquid crystal display device of the present invention using a liquid crystal composition in which splay elastic constant $K_{11}$ of the nematic liquid crystal is increased to reduce elastic constant ratio $K_{33}/K_{11}$, both of rise time $t_{ON}$ and decay time $t_{OFF}$ are reduced to provide a high response speed.

The liquid crystal display device having a small Δn·d value provides a better viewing angle characteristic, and its liquid crystal layer thickness d can be reduced. Therefore, the intensity of the electric field to be applied to the liquid crystal composition can be increased to achieve high-speed response.

Especially when the above liquid crystal display device is used for displaying a motion picture such an a television image, the response speed must be 30 msec or less. In this case, if the Δn·d values are 0.73, 0.76, and 0.71 as in Examples 20, 25, and 63, respectively, the response speed is reduced. If the Δn·d values are 0.53, 0.52, and 0.53, respectively, as in Examples 13, 70, and 69 and 71, the contrast is lowered. Therefore, the Δn·d value is set within the range of 0.54 to 0.70. If liquid crystal layer thickness d is large, the response speed is lowered, and the viewing angle characteristic is degraded. Therefore, layer thickness d is set to be 7 (μm) or less. If the optical anisotropy Δn value is large, the viewing angle characteristic is degraded. Therefore, the optical anisotropy Δn value of the liquid crystal composition is set to be 0.14 or less.

The liquid crystal display devices using the liquid crystal compositions of the above examples provide high contrast values, better viewing angle characteristics, and high response speeds but have relatively high threshold voltages. This is because in order to reduce dielectric ratio $\Delta\epsilon/\epsilon_\perp$ to be 0.5 or less, the value of $\Delta\epsilon$ of the composition can be increased to at most 3 because the value of $\epsilon_\perp$ of a liquid crystal compound which is normally used is 3 to 5. Therefore, as represented by equation (4), threshold voltage $V_C$ is increased when $\Delta\epsilon$ is reduced. High threshold voltage $V_C$ increases a voltage of a drive signal for driving the liquid crystal display device. However, the drive signal can be arbitrarily set by a driver.

As has been described above, the elastic constant ratio $K_{33}/K_{11}$ values of the liquid crystal compositions of the present invention are smaller than those of the conventional liquid crystal composition, and their $\Delta\epsilon/\epsilon_\perp$ values are 0.5 or less. Therefore, the multiplex drive liquid crystal display device having better characteristics such as contrast can be obtained with a Δn·d value of less than 1.1. The liquid crystal display device using the liquid crystal composition of the present invention is suitable for use in a matrix display apparatus for displaying characters, figures, and the like using a number of dots. Especially for use in a liquid crystal display device which must respond at high speed in order to display a television image or the like, the liquid crystal composition having low-viscosity and an optical anisotropy Δn value of 0.14 or less suitable.

What is claimed is:

1. A nematic liquid crystal composition having a positive dielectric anisotropy, comprising:

20 wt % to 70 wt % of a first liquid crystal material consisting of at least one liquid crystal compound represented by a formula

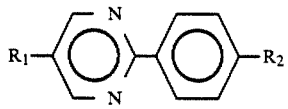  (I)

wherein $R_1$ represents a linear alkyl group having 2 to 9 carbon atoms and $R_2$ represents a linear alkyl group or alkoxy group having 2 to 9 carbon atoms;

30 wt % to 80 wt % of a third liquid crystal material consisting of at least one liquid crystal compound represented by formulas

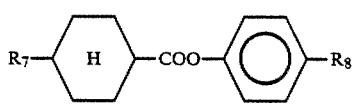  (VI)

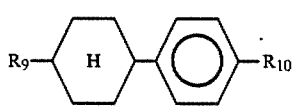  (VII)

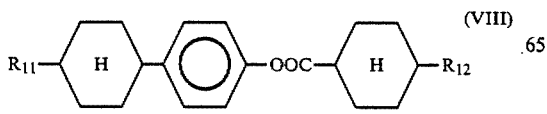  (VIII)

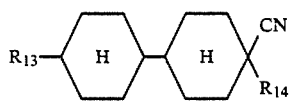  (IX)

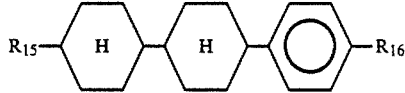  (X)

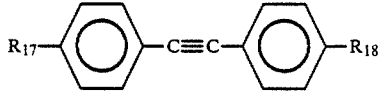  (XI)

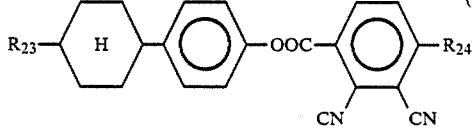  (XIV)

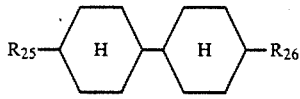  (XV)

wherein $R_7$ represents a linear alkyl group having 3 to 5 carbon atoms and $R_8$ represents a linear alkyl group or alkoxy group having 1 to 5 carbon atoms, $R_9$ represents a linear alkyl group having 3 to 5 carbon atoms, $R_{10}$ represents a linear alkyl group or alkoxy group having 1 to 4 carbon atoms, $R_{11}$ represents a propyl group, each of $R_{12}$ and $R_{13}$ independently represents a linear alkyl group having 4 or 5 carbon atoms, $R_{14}$ represents a linear alkyl group having 5 to 7 carbon atoms, $R_{15}$ represents a propyl group, $R_{16}$ represents a linear alkyl group having 1 to 3 carbon atoms, $R_{17}$ represents a linear alkyl group having 3 to 5 carbon atoms, $R_{18}$ represents an alkoxy group having 1 or 2 carbon atoms, $R_{23}$ represents a linear alkyl group having 3 or 4 carbon atoms, $R_{24}$ represents a linear alkyl group having 2 to 4 carbon atoms, $R_{25}$ represents a propyl group, and $R_{26}$ represents an ethoxy group in which the value of the dielectric anisotropy $\Delta\epsilon$ is negative or substantially "0"; and optionally, not more than 10 wt % of a second liquid crystal material consisting of at least one liquid crystal compound having a positive dielectric anisotropy $\Delta\epsilon$ and represented by formulas:

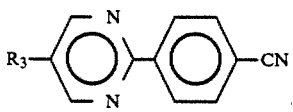  (II)

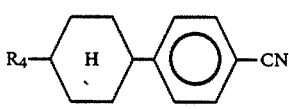  (III)

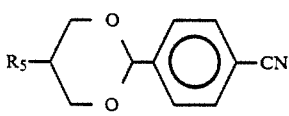  (IV)

-continued

(V)

wherein $R_3$ represents a linear alkyl group having 4 to 7 carbon atoms, $R_4$ represents a propyl group, $R_5$ represents a linear alkyl group having 3 to 5 carbon atoms, and $R_6$ represents an ethyl group; wherein said nematic liquid crystal composition contains at least one kind of liquid crystal compound selected from the compounds of formulas (VIII), (IX), (X), (XI) and (XIV), the compounds of formulas (IX) and (XIV) being mixed at a mixing ratio of 3 wt % to 22 wt % and 5 wt % to 12 wt %, respectively, and the entire liquid crystal composition has a dielectric ratio $\Delta\epsilon/\epsilon\perp$ smaller than 0.5 and an elastic constant ratio $K_{33}/K_{11}$ smaller than 0.8.

2. The composition according to claim 1, wherein the total of mixing ratios of said first and third liquid crystal materials is 100 wt %, and the dielectric anisotropy $\Delta\epsilon$ value of the entire composition is not more than 3.

3. The composition according to claim 2, wherein said third liquid crystal material contains:
8 wt % to 60 wt % of at least one liquid crystal compound represented by formula (VI); and
at least one liquid crystal compound represented by formulas (VII), (VIII), (IX), (X) and (XI), the compounds of formulas (VII), (VIII), (IX), (X) and (XI) are mixed at mixing ratios of 15 wt % to 22 wt %, 12 wt % to 18 wt %, 4 wt % to 8 wt %, 7 wt % to 25 wt %, and 2 wt % to 4 wt %, respectively, with the total of the third liquid crystal material comprising 30 wt % to 80 wt % based on the total weight of said liquid crystal composition.

4. The composition according to claim 1, wherein at least one liquid crystal compound represented by the formula (I) is mixed at a mixing ratio of 20 to 65 wt % as said first liquid crystal material,
at least one liquid crystal compound represented by the formula (II) is mixed at a mixing ratio of not more than 10 wt % as said second liquid crystal material, and
said third liquid crystal material is mixed at a mixing ratio of 30 to 75 wt %.

5. The composition according to claim 1, wherein said third liquid crystal material contains at least one liquid crystal compound represented by formulas (VI) and (VII); and
at least one liquid crystal compound represented by formulas (VIII), (IX), (X), (XI), (XIV) and (XV), said third liquid crystal material being mixed at a mixing ratio of 30 wt % to 80 wt % based on the total weight of said liquid crystal composition.

6. The composition according to claim 5, wherein at least one liquid crystal compound represented by the formula (II) is mixed at a mixing ratio of 0.5 wt % to 5 wt % as said second liquid crystal material.

7. The composition according to claim 5, wherein the mixing ratios of said liquid crystal compounds represented by formulas (VI) and (VII) are 6 wt % to 62 wt % and 8 wt % to 27 wt %, respectively, and mixing ratios of said liquid crystal compounds represented by formulas (VIII), (X), (XI) and (XV) are 10 wt % to 20 wt %, 2 wt % to 25 wt %, 1 wt % to 22 wt % and 15 wt % to 20 wt %, respectively.

8. The composition according to claim 7, wherein said first liquid crystal material contains 20 wt % to 30 wt % of at least one liquid crystal compound represented by formula (I);
said second liquid crystal material contains more than 5 wt % to not more than 10 wt % of at least one liquid crystal compound represented by formula (II); and
said third liquid crystal material contains four liquid crystal compounds represented by formulas (VI), (VII), (IX) and (XIV), said compounds represented by formulas (VI), (VII), (IX) and (XIV) being mixed at mixing ratios of 30 wt % to 45 wt %, 14 wt % to 20 wt %, 10 wt % to 21 wt %, and 5 wt % to 11 wt %, respectively, with total of these four liquid crystal compounds comprising 30 wt % to 80 wt % based on the total weight of said liquid crystal composition.

9. The composition according to claim 5, wherein said third liquid crystal material contains two liquid crystals compounds represented by formulas (VI) and (VII), and at least one liquid crystal compound selected from the group consisting of said liquid crystal compound represented by formulas (VIII), (IX), (X), (XI) and (XIV), the amounts of compounds represented by formulas (IV), (VII) (VIII), (IX), (X), (XI) and (XIV) are 6 wt % to 50 wt %, 8 wt % to 27 wt %, 10 wt % to 20 wt %, 3 wt % to 20 wt %, 2.5 wt % to 22 wt %, 1 wt % to 13 wt %, and 5 wt % to 11 wt %, respectively, with total of said third liquid crystal material comprising 30 wt % to 80 wt % based on the total weight of said liquid crystal composition.

10. The composition according to claim 5, wherein said third liquid crystal material contains said liquid crystal compounds represented by the formulas (VI), (VIII), and (IX).

11. The composition according to claim 5, wherein said third liquid crystal material contains said liquid crystals compounds represented by the formulas (VI), (X), and (XI).

12. The composition according to claim 9, wherein said third liquid crystal material contains said liquid crystal compounds represented by the formulas (VIII) and (IX).

13. The composition according to claim 9, wherein said third liquid crystal material contains said liquid crystal compound represented by the formula (X).

14. The composition according to claim 9, wherein said third liquid crystal material contains said liquid crystal compounds represented by the formulas (X) and (XI).

15. The composition according to claim 9, wherein said third liquid crystal material contains said liquid crystal compounds represented by the formulas (IX), (X), and (XI).

16. The composition according to claim 9, wherein said third liquid crystal material contains said liquid crystal compound represented by the formula (VIII).

17. The composition according to claim 9, wherein said third liquid crystal material contains said liquid crystal compound represented by the formula (XIV).

18. The device according to claim 9, wherein said liquid crystal composition comprises only said first and third liquid crystal materials and has a dielectric anisotropy $\Delta\epsilon$ value of less than 3, a dielectric ratio $\Delta\epsilon/\epsilon\perp$ of not more than 0.5, and an elastic constant ratio $K_{33}/K_{11}$ value of not more than 0.8.

19. A liquid crystal display device, comprising:
a pair of substrates having electrodes formed such that inner surfaces said electrodes oppose each other; and
a nematic liquid crystal composition interposed between said pair of substrates, said liquid crystal composition comprising:
20 wt % to 70 wt % of a first liquid crystal material consisting of at least one liquid crystal compound represented by a formula:

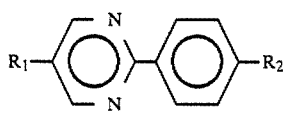  (I)

wherein $R_1$ represents a linear alkyl group having 2 to 9 carbon atoms and $R_2$ represents a linear alkyl group or alkoxy group having 2 to 9 carbon atoms;
30 wt % to 80 wt % of a third liquid crystal material consisting of at least one liquid crystal compound represented by formulas:

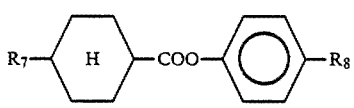  (VI)

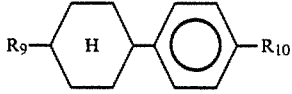  (VII)

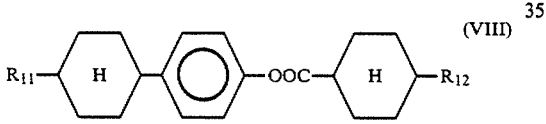  (VIII)

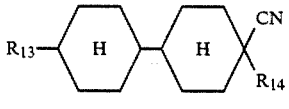  (IX)

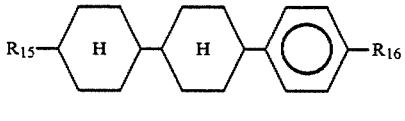  (X)

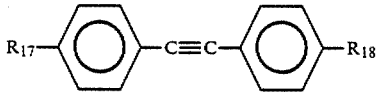  (XI)

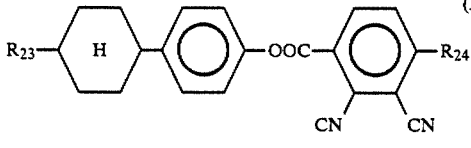  (XIV)

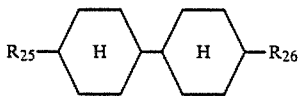  (XV)

wherein $R_7$ represents a linear alkyl group having 3 to 5 carbon atoms and $R_8$ represents a linear alkyl group or alkoxy group having 1 to 5 carbon atoms, $R_9$ represents a linear alkyl group having 3 to 5 carbon atoms, $R_{10}$ represents a linear alkyl group or alkoxy group having 1 to 4 carbon atoms, $R_{11}$ represents a propyl group, each of $R_{12}$ and $R_{13}$ independently represents a linear alkyl group having 4 or 5 carbon atoms, $R_{14}$ represents a linear alkyl group having 5 to 7 carbon atoms, $R_{15}$ represents a propyl group, $R_{16}$ represents a linear alkyl group having 1 to 3 carbon atoms, $R_{17}$ represents a linear alkyl group having 3 to 5 carbon atoms, $R_{18}$ represents an alkoxy group having 1 or 2 carbon atoms, $R_{23}$ represents a linear alkyl group having 3 or 4 carbon atoms, $R_{24}$ represents a linear alkyl group having 2 to 4 carbon atoms, $R_{25}$ represents a propyl group, and $R_{26}$ represents an ethoxy group)
in which the value of the dielectric anisotropy $\Delta\epsilon$ is negative or substantially "0"; and
optionally, not more than 10 wt % of a second liquid crystal material consisting of at least one liquid crystal compound having a positive dielectric anisotropy $\Delta\epsilon$ and represented by formulas:

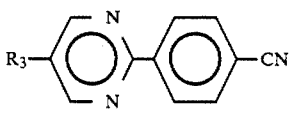  (II)

  (III)

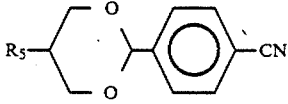  (IV)

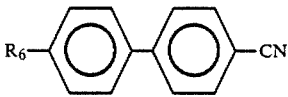  (V)

wherein $R_3$ represents a linear alkyl group having 4 to 7 carbon atoms, $R_4$ represents a propyl group, $R_5$ represents a linear alkyl group having 3 to 5 carbon atoms, and $R_6$ represents an ethyl group;
wherein said nematic liquid crystal composition contains at least one kind of liquid crystal compound selected from the compounds of formulas (VIII), (IX), (X), (XI) and (XIV), the compounds of formulas (IX) and (XIV) being mixed at a mixing ratio of 3 wt % to 22 wt % and 5 wt % to 12 wt %, respectively, and the entire liquid crystal composition has a dielectric ratio $\Delta\epsilon/\epsilon\perp$ smaller than 0.5 and an elastic constant ratio $K_{33}/K_{11}$ smaller than 0.8.

20. The device according to claim 19, wherein said third liquid crystal material of said liquid crystal composition contains:
at least one liquid crystal compound represented by formulas (VI) and (VII); and
at least one liquid crystal compound represented by formulas (VIII), (IX), (X), (XI), (XIV) and (XV), said third liquid crystal material being mixed at a mixing ratio of 30 wt % to 80 wt % based on the total weight of said liquid crystal composition.

21. The composition according to claim 11, wherein said third liquid crystal material contains at least two liquid crystal compounds selected from the group of three compounds represented by formulas (VIII), (IX) and (XIV), the amounts of the compounds represented by formulas (VIII) and (IX) being 10 wt % to 20 wt % and 3 wt % to 20 wt %, respectively, with total of two compounds comprising 30 wt % to 36 wt % based on the total weight of said liquid crystal composition.

22. A nematic liquid crystal composition having a positive dielectric anisotropy, comprising:

26 wt % to 54 wt % of a first liquid crystal material consisting of at least one liquid crystal compound represented by a formula:

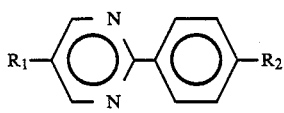  (I)

wherein $R_1$ represents a linear alkyl group having 2 to 9 carbon atoms and $R_2$ represents a linear alkyl group or alkoxy group having 2 to 9 carbon atoms; and 46 wt % to 76 wt % of a third liquid crystal material consisting of at least one liquid crystal compound represented by formulas:

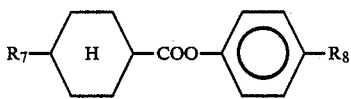  (VI)

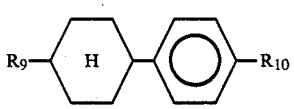  (VII)

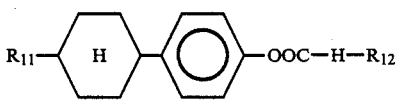  (VIII)

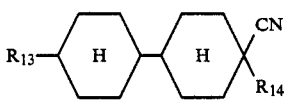  (IX)

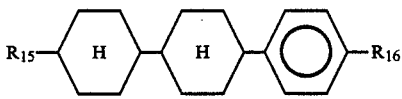  (X)

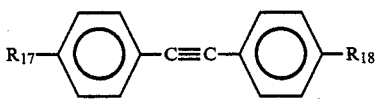  (XI)

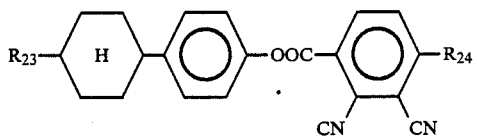  (XIV)

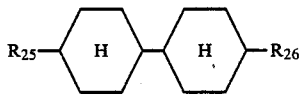  (XV)

wherein $R_7$ represents a linear alkyl group having 3 to 5 carbon atoms and $R_8$ represents a linear alkyl group or alkoxy group having 1 to 5 carbon atoms, $R_9$ represents a linear alkyl group having 3 to 5 carbon atoms, $R_{10}$ represents a linear alkyl group or alkoxy group having 1 to 4 carbon atoms, $R_{11}$ represents a propyl group, each of $R_{12}$ and $R_{13}$ independently represents a linear alkyl group having 4 or 5 carbon atoms, $R_{14}$ represents a linear alkyl group having 5 to 7 carbon atoms, $R_{15}$ represents a propyl group, $R_{16}$ represents a linear alkyl group having 1 to 3 carbon atoms, $R_{17}$ represents a linear alkyl group having 3 to 5 carbon atoms, $R_{18}$ represents an alkoxy group having 1 or 2 carbon atoms, $R_{23}$ represents a linear alkyl group having 3 or 4 carbon atoms, $R_{24}$ represents a linear alkyl group having 2 to 4 carbon atoms, $R_{25}$ represents a propyl group, and $R_{26}$ represents an ethoxy group in which the value of the dielectric anisotropy $\Delta\epsilon$ is negative or substantially "0", the compounds of the third liquid crystal material represented by formulas (IX) and (XIV) are mixed at mixing ratios of up to 22 wt % and up to 12 wt %, respectively, and said liquid crystal composition does not contain liquid crystal compounds having a cyano group and a dielectric anisotropy $\Delta\epsilon$ greater than $+10$.

23. The composition according to claim 22, wherein said third liquid crystal material contains at least one liquid crystal compound represented by formula (VI), and at least one liquid crystal compound selected from the compounds represented by formulas (VIII), (IX), (X) and (XI), the amounts of the compounds represented by formulas (VI), (VIII), (IX), (X) and (XI) being 35 wt % to 60 wt %, 12 wt % to 18 wt %, 4 wt % to 8 wt %, up to 7 wt % and up to 4 wt %, respectively, based on total weight of said liquid crystal composition.

24. The composition according to claim 22, wherein said third liquid crystal material contains at least one liquid crystal compound represented by formula (VI), and at least one liquid crystal compound selected from the compounds represented by formulas (VII), (VIII), (IX), (X) and (XI), the amounts of the compounds represented by formulas (VI), (VII), (VIII), (IX), (X) and (XI) being 8 wt % to 60 wt %, 15 wt % to 22 wt %, 12 wt % to 18 wt %, up to 8 wt %, 7 wt % to 25 wt %, and up to 4 wt %, respectively, based on total weight of said liquid crystal composition.

25. The composition according to claim 11, wherein said liquid crystal composition has a dielectric anisotropy $\Delta\epsilon$ smaller than $+3$.

* * * * *